United States Patent
Ito et al.

(10) Patent No.: US 6,677,703 B2
(45) Date of Patent: Jan. 13, 2004

(54) COVER PLATE FOR DISPLAY DEVICE, METHOD OF MAKING THE SAME, DISPLAY DEVICE AND REFLECTION REDUCING STRUCTURE

(75) Inventors: Arimichi Ito, Shinjuku-Ku (JP); Toshiyuki Suzuki, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 3 days.

(21) Appl. No.: 10/171,747

(22) Filed: Jun. 17, 2002

(65) Prior Publication Data

US 2003/0011315 A1 Jan. 16, 2003

(30) Foreign Application Priority Data

Jun. 20, 2001 (JP) .......................................... 2001-185965

(51) Int. Cl.⁷ ................................................ H01J 29/28
(52) U.S. Cl. ........................ 313/478; 313/479; 359/609; 445/24
(58) Field of Search ................................. 313/478, 479, 313/480; 445/23, 24; 359/609

(56) References Cited

U.S. PATENT DOCUMENTS 5,254,904 A * 10/1993 Van De Leest et al. ..... 313/479
5,385,499 A * 1/1995 Ogawa et al. ................. 445/24

* cited by examiner

Primary Examiner—David Vu
(74) Attorney, Agent, or Firm—Parkhurst & Wendel, L.L.P.

(57) ABSTRACT

A cover plate covering a display panel of a display device has a transparent base having a surface facing the display panel and provided with reflection-reducing minute irregularities. The reflection-reducing minute irregularities consist of numerous projections and numerous valleys lying between the projections, and meet a condition expressed by: $P_{MAX} \leq \lambda_{MIN}$, where $P_{MAX}$ is the maximum distance between the tips of the adjacent projections, and $\lambda_{MIN}$ is the minimum wavelength in a visible region in a vacuum. The sectional area ratio of total area of sections of the projections of the transparent base in a plane parallel to the transparent base in the plane increases continuously and gradually in a direction from the tips of the projections toward bottoms of the valleys.

29 Claims, 5 Drawing Sheets

COVER PLATE FOR DISPLAY DEVICE, METHOD OF MAKING THE SAME, DISPLAY DEVICE AND REFLECTION REDUCING STRUCTURE

BACKGROUND OF THE INVENTION

1. Field of the Invention

The present invention relates to a cover plate for a display device using a liquid crystal display (LCD) or the like and intended for use as a display unit for various electronic devices, such as portable telephones, a method of making such a cover plate, a display device employing such a cover plate, and a low-reflection structure.

2. Description of the Related Art

Various current electronic devices are provided with a display unit including a liquid crystal display (LCD) as a display panel, and the display panel is not exposed to protect the same from water, dust, external forces and the like. A window paned with a cover plate, such as a transparent plastic plate, is disposed on the outer side of the display panel with a space between the cover plate and the display panel (JP-A No. 66859/1995). For example, a portable telephone has a case formed by molding a resin or the like and provided with a window corresponding to a display unit and paned with a transparent cover plate, and a liquid crystal display panel mounted on a base plate is disposed on the inner side of the window to protect the liquid crystal display panel.

The additional, protective cover plate lying between the display panel and the user reflects external light to make it difficult for the user to see an image displayed on the display panel, and reflects image light emitted by the display panel to reduce light utilization efficiency. Thus, while the cover plate achieves protective purposes, the same deteriorates visibility.

To solve such a problem, a method proposed in JP-A No. 127852/2001 forms a single-layer antireflection film or a multilayer antireflection film consisting of a layer having a high refractive index and a layer having a low refractive index by a vapor deposition process, a sputtering process or a coating process on a cover plate, and a method proposed in JP-A No. 325202/1995 applies an antireflection film to a cover plate. The antireflection films formed by a vapor deposition process, a sputtering process or such have problems in stability and the ratio of good antireflection films, and cannot be manufactured at a high productivity because thin films having a controlled refractive index must be formed by one or a plurality of cycles of a batch process. The antireflection films formed by a coating process must be formed individually on cover plates and hence cannot be formed at a high productivity.

SUMMARY OF THE INVENTION

It is an object of the present invention to provide a cover plate to be disposed in front of a display panel, capable of reducing reflection of light, of maintaining its function and of improving visibility, a method capable of stably making the cover plate at a high productivity at a low fraction defective, a display device provided with the cover plate, and a low-reflection structure.

According to the present invention, a cover plate for a display device provided with a display panel, disposed so as to cover the display panel has a transparent base having a surface facing the display panel and provided with reflection-reducing minute irregularities; wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in a visible region of visible light in a vacuum, and the sectional area ratio of the total area of sections of the projections of the transparent base in a plane parallel to the transparent base in the plane increases continuously and gradually in a direction from the tips of the projections toward the bottoms of the valleys.

In the cover plate according to the present invention, the transparent base meets a condition expressed by:

$$P_{MAX} \leq \lambda_{MIN}/n_b$$

where $n_b$ is a refractive index of the transparent base.

In the cover plate according to the present invention, the minimum wavelength $\lambda_{MIN}$ in the visible region in a vacuum is 380 nm and hence $P_{MAX} \leq 380/n_b$.

In the cover plate according to the present invention, the projections and the valleys of the reflection-reducing minute irregularities have substantially the same shapes, respectively.

In the cover plate according to the present invention, the projections and the valleys of the reflection-reducing minute irregularities are arranged at the same pitches.

In the cover plate according to the present invention, the projections of the reflection-reducing minute irregularities meet a condition expressed by:

$$H_{MIN} \geq 0.2 \lambda_{MAX}$$

where $H_{MIN}$ is the minimum height of the projections.

In the cover plate according to the present invention, the projections of the reflection-reducing minute irregularities meet a condition expressed by:

$$H_{MIN} \geq 0.4 \lambda_{MAX}$$

In the cover plate according to the present invention, the projections of the reflection-reducing minute irregularities meet a condition expressed by:

$$H_{MIN}/P_{MAX} = 1/2 \text{ to } 4/1$$

The refractive index between the back surface of the cover plate and air can be made to change continuously and gradually instead of discontinuously and sharply. Since the reflection of light at the interface between substances is caused by the sudden change in refractive index, the reflection of light by the back surface of the cover plate can be reduced by making the refractive index at the back surface of the cover plate change continuously and gradually. Consequently, light rays reflected by the back surface of the cover plate among light rays reflected toward the user by the front and the back surface of the cover plate among external light rays that affect the visibility of a displayed image, more strictly, visible light fallen on the cover plate, can be eliminated and hence the total amount of the light rays reflected by the cover plate can be reduced accordingly. Thus, the deterioration of visibility by the reflected external light can be reduced. Since the specific minute irregularities are formed only on the back surface of the cover plate and is not formed on the front surface of the same, the reduction of the reflection-reducing effect of the reflection-reducing minute irregularities due to the abrasion of the reflection-reducing minute irregularities and soiling of the reflection-reducing minute irregularities with oil, i.e., filling of the valleys with oil, does not occur.

In a display device provided with this cover plate, reflection of display light (image light) emitted by a display panel disposed behind the cover plate by the back surface of the cover plate can be reduced and the cover plate has a high transmittance, whereby the reduction of contrast in the displayed image and the resultant whitening due to multiple reflection of the display light between the front and the back surface of the cover plate can be prevented and the visibility of the displayed image can be improved. Since visibility is improved, the power demand of the back light or front light of the liquid crystal panel or the power demand of the display panel, such as an EL panel can be reduced, which contributes to the reduction of the power demand and power consumption of the related electronic devices.

The reflection-reducing effect of the specific minute irregularities can be enhanced by determining the relation between $P_{MAX}$ and $\lambda_{MIN}$ by using the refractive index $n_b$ of the transparent base, taking into consideration the wavelength of light which becomes shorter when the light enters the transparent base from a vacuum.

According to the present invention, a cover plate making method of making a cover plate for a display device, having a transparent base having one surface provided with reflection-reducing minute irregularities includes the steps of: forming a resist film on a glass plate, forming a resist pattern by subjecting the resist film to exposure and developing processes for patterning; forming a mold provided with mold minute irregularities by etching the glass plate using the resist pattern as a mask; and forming the transparent base provided with the reflection-reducing minute irregularities by using the mold provided with the mold reflection-reducing minute irregularities.

In the cover plate making method according to the present invention, the resist pattern is formed by exposing the resist film by electron beam lithography, and developing the exposed resist film for patterning.

In the cover plate making method according to the present invention, the resist pattern is formed by exposing the resist film to light by laser beam lithography, and developing the exposed resist film for patterning.

In the cover plate making method according to the present invention, the transparent base provided with the reflection-reducing minute irregularities is molded by an injection molding process using the mold provided with the mold minute irregularities.

The cover plate making method using the mold is able to mass-produce easily cover plates provided with the specific minute irregularities.

The cover plate making method is capable of simultaneously forming the transparent base and the reflection-reducing minute irregularities of the same material, and of mass-producing the cover plates at a low manufacturing cost.

According to the present invention, a display device includes: a display panel; and a transparent base covering the display panel and having a surface facing the display panel and provided with reflection-reducing minute irregularities; wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in the visible region in a vacuum, and the sectional area ratio of the total area of sections of the projections of the transparent base in a plane parallel to the transparent base in the plane increases continuously and gradually in a direction from the tips of the projections toward bottoms of the valleys.

The display device according to the present invention is able to enjoy the foregoing effect of the cover plate. Consequently, the visibility of displayed images is improved, and the energy consumption and power demand of the display device can be reduced.

According to the present invention, a low-reflection structure includes a transparent base having one surface provided with reflection-reducing minute irregularities, and an antireflection film formed on the other surface of the transparent base; wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in the visible region in a vacuum, and the sectional area ratio of the total area of the sections of the projections of the transparent base in a plane parallel to the transparent base in the plane increases continuously and gradually in a direction from the tips of the projections toward bottoms of the valleys.

In the low-reflection structure according to the present invention, the reflection-reducing minute irregularities reduce reflection of light by the surface provided with the reflection-reducing minute irregularities, and the antireflection film formed on the other surface reduces reflection of light by the surface covered with the antireflection film. Thus the reflection-reducing ability of this low-reflection structure is higher than that of a structure having only one surface provided with the reflection-reducing minute irregularities. Reflection of light, which is a phenomenon that occurs when refractive index changes suddenly and discontinuously, can be reduced by the reflection-reducing minute irregularities because the refractive index between a surface of a medium and air can be made to change continuously and gradually by forming minute irregularities of sizes smaller than the wavelengths of light, which must be prevented from reflecting, in the surface of the medium.

Since the irregularities of the present invention reduce the reflection of light by the surface of the medium by making the refractive index change gradually at the interface between the surface of the medium and air instead of preventing specular reflection of light by a satin-finished surface for glare prevention, transmittance can be improved according to the reduction of reflectance. The antireflection film formed on the surface other than the surface provided with the reflection-reducing minute irregularities is not an antiglare film that reduces specular reflection and hence the antireflection film improves transmittance according to the reduction of reflectance. Accordingly, when the low-reflection structure is used as a cover plate for covering the display unit of a display or the like, the low-reflection structure improves the visibility of displayed images and improves display light utilization efficiency.

According to the present invention, a reflection-reducing structure includes a transparent base having a first surface provided with reflection-reducing minute irregularities, and a second surface provided with antiglare irregularities of sizes greater than the wavelengths in the visible region;

wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in the visible region in a vacuum, and the sectional area ratio of the projections of the transparent base in a plane parallel to the transparent base increases continuously and gradually in a direction from the tips of the projections toward the bottoms of the valleys.

In the low-reflection structure according to the present invention, the reflection-reducing minute irregularities reduce reflection of light by the first surface, and the antiglare irregularities reduce reflection of light by the second surface. Thus, the reflection-reducing ability of this low-reflection structure is higher than that of a low-reflection structure provided with minute irregularities only in one of its surfaces.

The low-reflection structure may be used for the same reflection-reducing effect with either the first surface provided with the reflection-reducing minute irregularities or the second surface provided with the antiglare irregularities facing outside. Thus, the user may optionally decide which of the first and the second surface to use as an outer surface. However, in view of the durability of reflection-reducing effect and the effective utilization of the antiglare ability, the reflection-reducing structure is used with the first surface provided with the reflection-reducing minute irregularities facing inside and the second surface provided with the antiglare irregularities facing outside; that is, the low-reflection structure is used such that the first surface provided with the reflection-reducing minute irregularities serves as an inner surface, i.e., a back surface which is not exposed outside and less possible to be damaged than a front surface, and the second surface provided with the antiglare irregularities serving as an outer surface, i.e., a surface exposed outside and possible to be damaged. When the low-reflection structure is used in such a manner, the reflection-reducing effect of both the irregularities is hardly reduced by damaging, and the reflection-reducing effect is satisfactorily durable, and the front surface, i.e., the outer surface, has an antiglare ability.

Reflection of light, which is a phenomenon that occurs when refractive index changes suddenly and discontinuously, can be reduced by the reflection-reducing minute irregularities because the refractive index between a surface of a medium and air can be made to change continuously and gradually by forming minute irregularities of sizes smaller than the wavelengths of light rays which must be prevented from reflecting in the surface of the medium.

Since the reflection-reducing minute irregularities reduce the reflection of light on the surface of the low-reflection structure by making the refractive index change gradually at the interface between the surface of the low-reflection structure and air instead of reducing reflection of light by specular reflection of light by the antiglare irregularities, transmittance can be improved according to the reduction of reflectance. Therefore, although the low-reflection structure is provided with the antiglare irregularities, when the reflection-reducing structure is used as a cover plate for covering the display unit of a display or the like, the reflection-reducing structure improves the visibility of displayed images and improves display light utilization efficiency.

DESCRIPTION OF THE PREFERRED EMBODIMENTS

First Embodiment

A first embodiment of the present invention will be described hereinafter.

Outline

Figure 1:
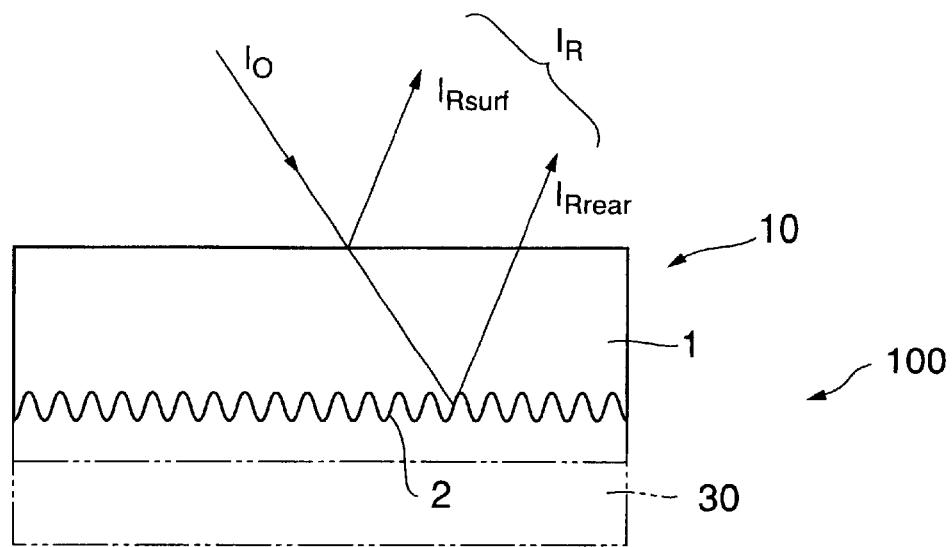
FIG. 1 is a typical sectional view of a cover plate in a first embodiment according to the present invention.

Referring to FIG. 1 showing a mask member 10 in a first embodiment according to the present invention for use in a display device 100 in a typical sectional view, the display device 100 has a display panel 30, and the cover plate 10 disposed on the outer side of the display panel 30 so as to cover the display panel 30. The cover plate 10 has a transparent base 1 having a back surface, i.e., a lower surface as viewed in FIG. 1, provided with specific, reflection-reducing minute irregularities 2 (hereinafter referred to simply as "minute irregularities 2"). As shown in FIG. 1, the minute irregularities 2 are formed in the back surface of the transparent base 1 facing the display panel 30. The minute irregularities 2 consist of numerous projections 21, and numerous valleys 22 lying between the projections 21. The cover plate 10 in this embodiment is not provided in its front surface with any minute irregularities similar to the specific minute irregularities 2. The minute irregularities 2 characteristic of the present invention have sizes not greater than wavelengths in the visible region and are different from irregularities of sizes not smaller than wavelengths in the visible region for forming a matte surface that scatters light (diffuse reflection). Sudden and discontinuous change of refractive index between the transparent base and an external medium (air) can be prevented and the refractive index can be made to change continuously and gradually by the minute irregularities. Since reflection of light is a phenomenon that occurs when refractive index changes suddenly and discontinuously at the interface between two different mediums, reflection-reducing effect can be produced by making the refractive index at the interface between the mediums change spatially and continuously. Since the minute irregularities are formed in the back surface of the transparent base and are not formed in the front surface of the same, the reduction of the reflection-reducing effect of the minute irregularities due to the abrasion of the minute irregularities and soiling of the same with oil, i.e., filling of the valleys 22 with oil, does not occur.

Part of incident light rays $I_0$ incident from above, as viewed in FIG. 1, on the front surface of the transparent base 1 are reflected in front reflected light rays $I_{Rsurf}$, and part of the incident light rays $I_0$, transmitted through the transparent base 1 is reflected by the back surface of the transparent base 1 in back reflected light rays $I_{Rrear}$. The sum of the reflected light rays $I_{Rsurf}$ and $I_{Rrear}$ travel in total reflected light rays $I_R$ toward the user. According to the present invention, the back reflected light rays $I_{Rrear}$ are removed or reduced, and hence the total reflected light rays $I_R$ is reduced accordingly. If the back reflected light rays $I_{Rrear}=0$, only the front reflected light rays $I_{Rsurf}$ travel toward the user.

Although minute irregularities similar to those formed on the back surface of the cover plate may be formed in the front surface of the cover plate to reduce reflection by the front surface, minute irregularities formed on the front surface are liable to be damaged and soiled, and the valleys 22 of the minute irregularities are liable to be filled up with soils and the like. Therefore, the cover plate 10 in this embodiment for the display device is not provided with any minute irregularities on its front surface. If necessary, irregularities, such as those forming an antiglare matte surface, may be formed in the front surface of the cover plate 10. The front surface of the cover plate 10 may be coated with a conventional antireflection layer having a low refractive index or a hard coating film. In this specification, the term "front surface" signifies a surface facing the user of the display device 100, i.e., the outer surface, and the term "back surface" signifies a surface facing the display panel 30, i.e., the inner surface.

Preferably, the minute irregularities 2 of the preferred embodiment are formed by duplication using a mold formed by electron-beam lithography or a laser-beam direct drawing process. Preferably, the cover plate 10 provided with the minute irregularities 2 can be mass-produced by an injection molding process using such a mold as an injection mold.

Minute Irregularities

Figure 2:
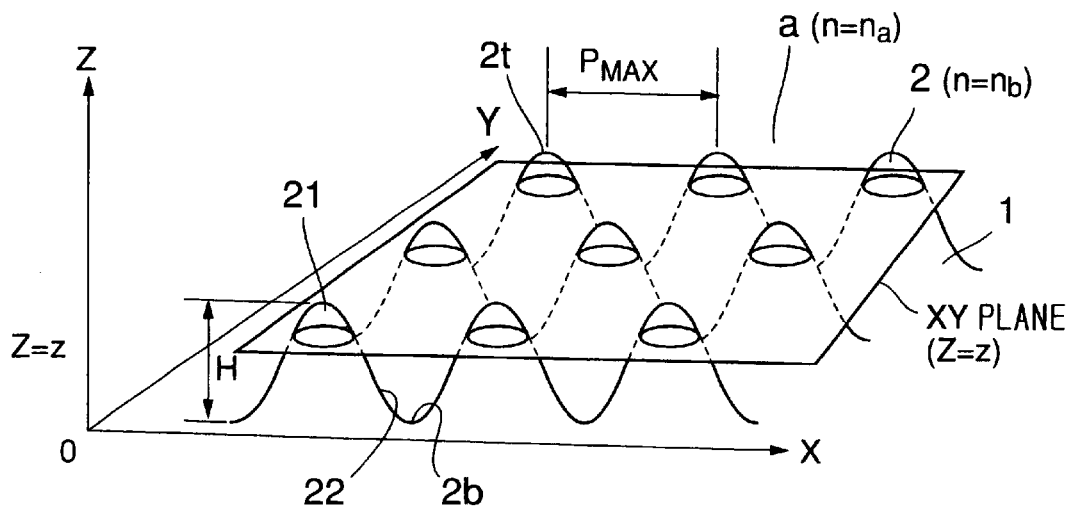
FIG. 2 is a schematic perspective view of assistance in conceptually explaining the distribution of effective refractive indices determined by minute irregularities.
Figure 3:
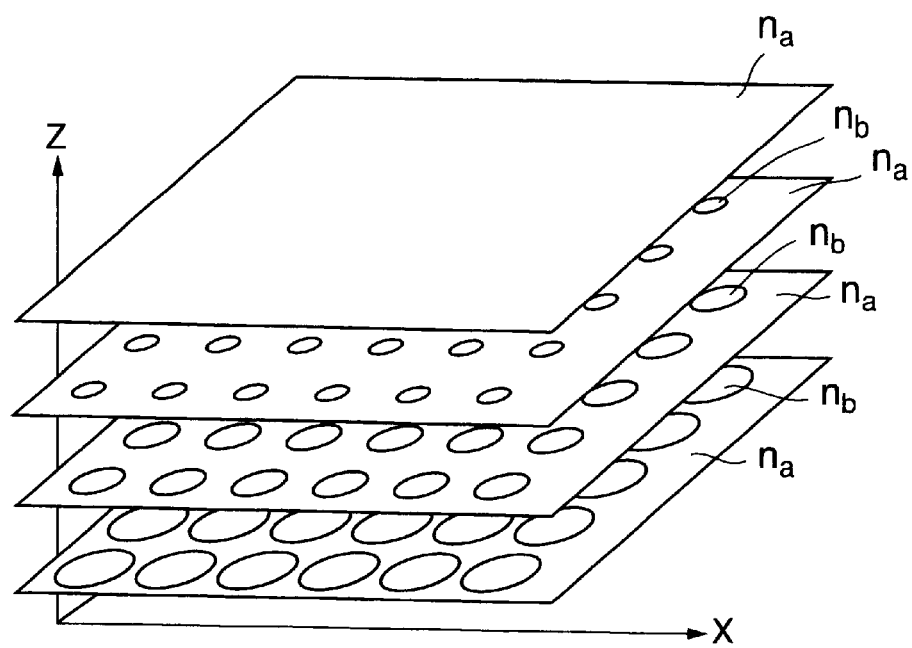
FIG. 3 is a schematic perspective view of assistance in conceptually explaining the distribution of effective refractive indices determined by minute irregularities.
Figure 4:
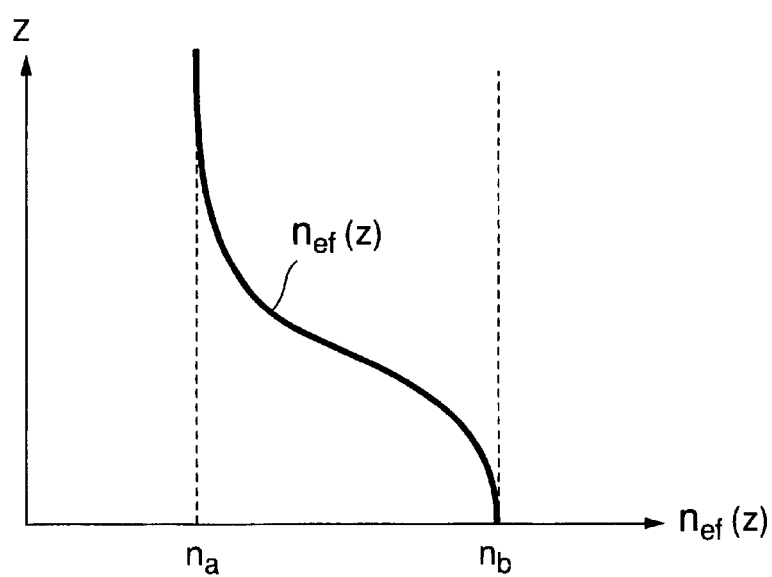
FIG. 4 is a graph of assistance in conceptually explaining the distribution of effective refractive indices determined by minute irregularities.

FIGS. 2 to 4 are views of assistance in conceptually explaining the dependence of a refractive index distribution on the minute irregularities 2. FIG. 2 shows a state where the body of the transparent base 1 extends in a space where $Z \leq 0$, the projections 21 of the minute irregularities 2 rise from an XY-plane at Z=0 and define the valleys 22 between them. In FIGS. 2 to 4, the back surface of the transparent base 1 is shown on the upper side to facilitate explanation.

According to the present invention, the maximum distance $P_{MAX}$ between the tips 2t of the adjacent projections 21 of the minute irregularities 2 is not greater than the minimum wavelength $\lambda_{MIN}$ in the visible region of visible light in a vacuum. Therefore, even if the refractive index at the interface between the mediums, i.e., the transparent base 1 and air, is distributed spatially, the refractive index distribution does not directly affect the diffraction of light rays fallen on the minute irregularities 2 because the periods of variation of refractive index is smaller than the minimum wavelength in the visible region. Instead an average refractive index, i.e., an effective refractive index obtained by averaging distributed refractive indices affects the diffraction of light rays. Thus, the reflection of light can be reduced by forming the minute irregularities 2 such that the refractive index distribution varies continuously in the direction of travel of light rays.

In the present invention, the maximum distance $P_{MAX}$ is the maximum distance between the tips 2t of the adjacent projections 21. The projections 21 of the minute irregularities 2 may be arranged either regularly so that the distances between the tips 2t of the adjacent projections 21 are equal to each other or irregularly so that the distances between the tips 2t of the adjacent projections 21 are different from each other.

In an orthogonal coordinate system shown in FIG. 2, Z-axis is parallel to a normal to the envelope of the transparent base 1, and the X- and the Y-axis are included in a plane perpendicular to the Z-axis. Suppose that light rays fallen on the front surface of the transparent base 1 have traveled through the transparent base 1, are traveling in the positive direction of the Z-axis in a region near the back surface of the transparent base 1, and the light rays are at a Z-coordinate of z.

Then, the refractive index of the medium with respect to light rays on an XY-plane at Z=z, i.e., a horizontal plane perpendicular to the Z-axis, intersecting the Z-axis at Z=z, and parallel to the front surface of the transparent base 1, has a distribution expressed by a function: f(x, y, z) because the transparent base 1 is provided with the specific minute irregularities 2. Thus, in the XY-plane, the projections 21 of the minute irregularities 2 of the transparent base 1 has a refractive index $n_b$ on the order of 1.5, and other parts of the same, i.e., spaces filled with air, has a refractive index $n_a$ on the order of 1.0.

However, actually, the average refractive index of a refractive index distribution of a spatial scale smaller than the wavelength of the light rays (the minimum wavelength $\lambda_{MIN}$ among the wavelengths of light rays when light rays relating to the visual recognition of images displayed by the display device 100 have a distribution) is an effective refractive index controlling the refraction of the light rays. The effective refractive index for the XY-plane is calculated by using Expression (1)

$$n_{ef}(z) = \int \int f(x,y,z)dxdy \quad (1)$$

Thus, the distribution of effective refractive index $n_{ef}$ is expressed by a function of z, i.e., $n_{ef}(z)$ as shown in FIG. 4.

Therefore, if the sectional area ratio of the projections 21, i.e., the ratio of the sectional area of the projections 21 of the transparent base 1 in a plane parallel to the transparent base 1, in the plane increases continuously from the tip 2t of the projection 21 toward the bottom 2b of the valley 22, the ratio between the sectional area of the transparent base 1 and the sectional area of the spaces filled with air in the XY-plane changes continuously in a direction parallel to the Z-axis. Consequently, the effective refractive index $n_{ef}(z)$ can be expressed by a continuous function of z.

Suppose that light rays travel from a first medium having a refractive index $n_0$ into a second medium having a refractive index $n_1$. Assume that the light rays fall on the second medium at an incident angle O=0° (perpendicular incidence) for simplicity. Incident angle is the angle formed by a light ray arriving at a surface and the perpendicular to that surface at the point of arrival of the light ray.

Reflectance R of the interface between the first and the second medium is independent on polarization and incident angle and is expressed by Expression (2).

$$R = \frac{(n_1 - n_0)^2}{(n_1 + n_0)^2} \quad (2)$$

When the effective refractive index thus changes continuously in the direction parallel to the Z-axis, the refractive index for $Z=z$ is $n_0$, and the refractive index for $Z=z+\Delta z$ is $n_1$, $n_1 \to n_0$ if $\Delta z \to 0$, and hence $R \to 0$ because the effective refractive index $n_{ef}(z)$ is a continuous function of z.

More strictly, the wavelength of a light ray traveling through a medium is $\lambda/n$, where $\lambda$ is the wavelength of the light ray in a vacuum and n is the refractive index of the medium. Generally, $\lambda/n$ is somewhat smaller than $\lambda$. If the medium is air, $n \approx 1$ and hence it is possible to assume that $\lambda/n \approx \lambda$. Materials suitable for forming the transparent base 1 of the cover plate 10, such as glass and acrylic resins, have refractive indices around 1.5. The wavelength $\lambda/n_b$ of a light ray traveling through the transparent base 1 having a refractive index $n_b$ is about $0.7\lambda$. When such a condition is taken into consideration, the effect of averaging refractive indices on the reduction of reflectance can be expected for parts filled with air, i.e., the valleys 22 of the minute irregularities, if the condition expressed by: $P_{MAX} \leq \lambda_{MIN}$ is satisfied. However, as regards the contribution of parts of the transparent base, i.e., the projections 21 of the minute irregularities 2, the effect of averaging refractive indices on the reduction of reflectance cannot perfectly be expected if $\lambda_{MIN}/n_b \leq P_{MAX} \leq \lambda_{MIN}$. However, owing to the effect of parts filled with air, the minute irregularities 2, as a whole, have a reflection-reducing effect.

If the condition: $P_{MAX} \leq \lambda_{MIN}/n_b$ is satisfied as well, the effect of averaging refractive indices on the reduction of reflectance is more satisfactory because both the parts filled with air and the parts of the transparent base 1 meet the condition that the maximum distance $P_{MAX}$ between the tips 2t of the adjacent projections 21 is shorter than the minimum wavelength.

More concretely, supposing that $\lambda_{min}=380$ nm, i.e., the lower limit of the visible region and $n_b=1.5$, $\lambda_{MIN}/n_b=250$ nm. Thus, the reflection-reducing effect is satisfactory when $P_{MAX}$ is 250 nm or below.

Figure 5:
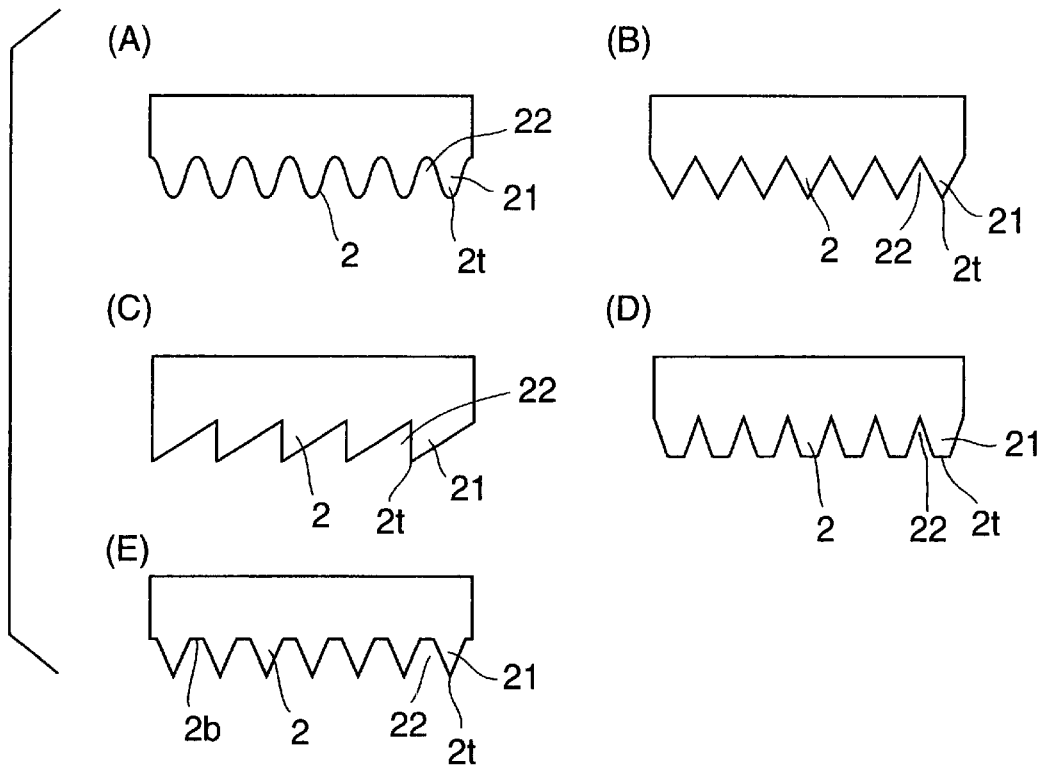
FIGS. 5(A) to 5(E) are typical sectional views of minute irregularities.

The minute irregularities 2 may be formed in any morphology, provided that the sectional area ratio of the projections 21 of the transparent base 1 in a plane parallel to the transparent base 1, i.e., an XY-plane in the plane, increases continuously and gradually in a direction from the tips 2t of the projections 21 toward the bottoms 2b of the valleys 22 to 1 on a plane including the bottoms 2b of the valleys 22. To make the sectional area ratio of the sectional area of the projections 21 in a plane parallel to the transparent base 1 in the plane increase continuously and gradually in a direction from the tips 2t of the projections 21 toward the bottoms 2b of the valleys 22, each of the projections 21 of the minute irregularities 2 may have at least one inclined surface. Each of the projections 21 of the minute irregularities 2 may have one inclined surface and one perpendicular surface perpendicular to the front surface of the transparent base 1 as shown in FIG. 5(C).

The sectional shape of each of the projections 21 of the minute irregularities 2 in a vertical plane may be a sinusoidal wavy shape as shown in FIG. 5(A) and FIG. 2, a shape defined only by straight lines, such as a triangular shape, as shown in FIGS. 5(B) and 5(C), a trapezoidal shape having a flat end corresponding to the tip 2t as shown in FIG. 5(D) or a triangular shape defining trapezoidal recesses respectively having flat bottoms corresponding to the bottoms 2b of the valleys 22 between the adjacent projections 21 as shown in FIG. 5(E). However, when the projections 21 have the trapezoidal sectional shape having the flat end corresponding to the tip 2t as shown in FIG. 5(D) or the triangular sectional shape defining recesses respectively having flat bottoms corresponding to the bottoms 2b of the valleys 22 as shown in FIG. 5(E), the effective refractive index changes greatly and discontinuously and the reflection-reducing ability is reduced if the ratio of the area of the flat tips 2t or the flat bottoms 2b is excessively large. However, even under such a condition, the effective refractive index can continuously be changed in the direction from the tips 2t of the projections 21 toward the bottoms 2b of the valleys 22. Therefore, as regards reflection-reducing ability, a smaller ratio of the area of the flat tips 2t or the flat bottoms 2b is more desirable.

Morphologies that make the sectional area ratio of the projections 21 of the transparent base 1 in a horizontal plane increase to 1 on a plane including the bottoms 2b of the valleys 22 include a morphology in which the sectional area ratio changes discontinuously at the plane including the bottoms 2b as shown in FIG. 5(E), such as a binary morphology, in which the sectional area ratio of one of them is equal to 1.

The sectional shape in an XY-plane, i.e., the horizontal sectional shape, of each of the projections 21 of the minute irregularities 2 may be any suitable shape; the sectional shape may be circular as shown in FIG. 2, elliptic, triangular, square, rectangular or polygonal. Horizontal sectional shapes in different XY-planes between the tip 2t of the projection 2 and the bottom 2b of the valley 22 of the minute irregularities 2 do not need to be analogous with each other. The projection 2 has the shape of a circular cone when its horizontal sectional shape is a circle and its vertical sectional shape an equilateral triangle, has the shape of an oblique cone when its horizontal sectional shape is an ellipse and its vertical sectional shape is triangle, has the shape of a frustum of circular cone when its horizontal sectional shape is a circle and its vertical sectional shape is a trapezoid, or has the shape of a pyramid when its horizontal sectional shape is a square and its vertical sectional shape is a triangle.

Figure 6:
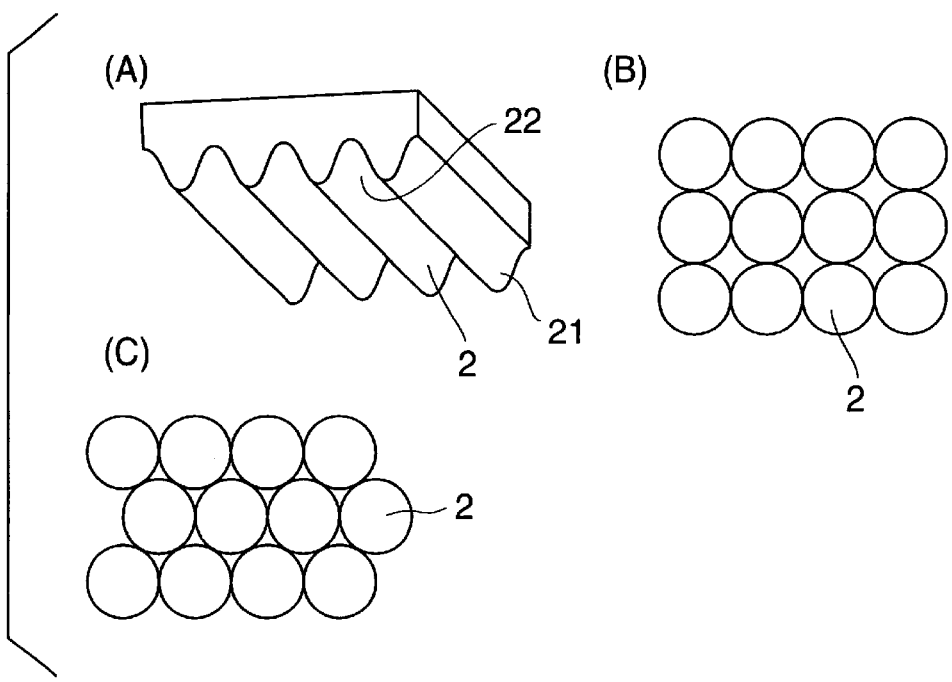
FIGS. 6(A) to 6(C) are a perspective view and plan views showing arrangement of projections and valleys of minute irregularities in a horizontal plane by way of example.

The projections 21 and the valleys 22 of the minute irregularities 2 are arranged two-dimensionally as shown in FIG. 2. When the minute irregularities 2 consist of ridges and furrows as shown in FIG. 6(A) in a perspective view, the ridges and the furrows are extended linearly. Both the minute irregularities 2 having the projections and valleys formed in a two-dimensional arrangement, and the minute irregularities having the ridges and the furrows formed in a linear arrangement are effective. The reflection-reducing effect of the minute irregularities having the ridges and the furrows formed in a linear arrangement is dependent on the direction of vibration of light waves; that is the reflection-reducing effect is an isotropic. Two-dimensional arrangement of the components of the minute irregularities 2 as shown in a perspective view in FIG. 2 and in plan views in FIGS. 6(B) and 6(C) is preferable because optical property of the minute irregularities 2 having the components formed in a two-dimensional arrangement is not directional at all.

All the projections 21 of the minute irregularities 2 may have either the same shape or different shapes, and all the valleys 22 of the same may have either the same shape or different shapes. The projections 21 and the valleys 22 of the minute irregularities 2 may be arranged in a two-dimensional arrangement either regularly or irregularly.

The height H of the projection 21 of the minute irregularities 2 is determined according to a desired reflection-reducing effect and the maximum wavelength among the wavelengths of light waves in the visible region that will be incident on the surface of the transparent base. For example, when designing the minute irregularities 2 on the basis of the relation between reflectance, the height of projections of the minute irregularities and wavelengths of light rays as mentioned in JP-A No. 70040/1975 (FIG. 3) and a desired reflectance for light rays in the visible region is 2%, which is half the reflectance of glass, it is preferable that the minimum height $H_{MIN}$ is $0.2\lambda_{MAX}$ or above, i.e., $H_{MIN} \geq 0.2\lambda_{MAX}$, where $\lambda_{MAX}$ is the maximum wavelength in the visible region. It is preferable that $H_{MIN} \geq 0.4\lambda_{MAX}$ when a desired reflectance for light rays in the visible region is 0.5% or below. The reflectance decreases as the height H of the projections 21 of the minute irregularities 2 increases from zero. When the height H is increased to a value satisfying a condition expressed by the foregoing inequality, the reflection-reducing ability of the minute irregularities 2 becomes effective. For example, when a fluorescent lamp having an emission spectrum with the maximum wavelength $\lambda_{MAX}$=640 nm, $H_{MIN} \geq 0.2\lambda_{MAX}$=128 nm; that is, the minimum height $H_{MIN}$ must be 128 nm or above. Suppose that solar light having a solar spectrum with the maximum wavelength $\lambda_{MAX}$=780 nm, then $H_{MIN} \geq 0.2\lambda_{MAX}$=156 nm; that is, the minimum height $H_{MIN}$ must be 156 nm or above. The ratio $H_{MIN}/P_{MAX}$, where $P_{MAX}$ is the maximum distance between the tips 25 of the adjacent projections 21, is in the range of about 1/2 to 4/1.

The morphology of the minute irregularities 2 will be concretely described. The minute irregularities 2 consist of numerous regularly and two-dimensionally arranged conical projections having a vertical section having the shape of a sinusoidal wave and a horizontal section having the shape of a circle. The maximum pitch between the tips $2t$ of the adjacent projections 21 is in the range of 50 to 250 nm. The minimum height $H_{MIN}$ of the projections 21 is 1.5 times the maximum pitch $P_{MAX}$.

The minute irregularities featuring the present invention are the application of a technique disclosed in U.S. Pat. No. 4,013,465 for "Method of Reducing Reflectance of Surface to Electromagnetic Waves" to the cover plate of a display device. However, a cover plate having a practically satisfactory reflection-reducing ability cannot be obtained by forming such minute irregularities only on the outer surface of the cover plate on which external light falls, because the minute projections of the minute irregularities formed on the outer surface that is liable to be soiled with dirt from the hands are dulled and the minute irregularities are unable to maintain its reflection-reducing effect for a long time. The inventors of the present invention found that minute irregularities formed on the back surface, i.e., the inner surface, of a cover plate are not damaged and not soiled with dart from the hands, and exercise a satisfactory reflection-reducing effect. It was found also that the minute irregularities formed on the back surface are superior to those formed on the front surface in respect of an effect of preventing contrast reduction due to multiple reflection of light between a display panel and the cover plate covering the display panel. The present invention has been made on the basis of those findings.

Transparent Base

Preferably, the transparent base 1 is transparent and has a sufficient mechanical strength. Materials suitable for forming the transparent base 1 are acrylic resins, such as polymethyl methacrylate resins, polyethyl methacrylate resins and methyl methacrylate-butyl methacrylate copolymers, polyolefin resins, such as polypropylene resins, polymethyl pentene resins and cyclic polyolefin polymers (norbornane resins, such as "ZENOA" commercially available from Nippon Zeon K. K. and "ARTON" commercially available from JSR K. K., are representative cyclic olefin polymers), thermoplastic polyester resins, such as polycarbonate resins, polyethylene terephthalate resins and polyethylene naphthalate resins, thermoplastic resins, such as polyamide resins, acrylonitrile-styrene copolymers, polyether sulfone resins, polysulfone resins, cellulose resins, vinyl chloride resins, polyether ether ketone resins and polyurethane resins, and glass.

The thickness of the transparent base 1 is determined so as to satisfy uses and required physical properties. Usually, the thickness of the cover plate 10 for protecting the display device 100 from external forces is in the range of about 0.5 to about 2 mm.

Figure 7:
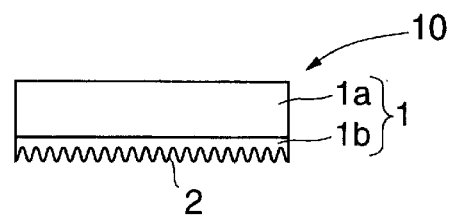
FIG. 7 is a typical sectional view of a cover plate in a modification.

The minute irregularities 2 are components of the transparent base 1. The transparent base 1 provided with the minute irregularities 2 may be either a member of a continuous quality formed of a single material, such as the cover plate 10 shown in FIG. 1, or a two-layer laminated member formed by closely joining together a reflection-reducing part 1b provided with the minute irregularities 2, and a transparent body part not having any minute irregularities, such as a cover plate 10 shown in FIG. 7. A cover plate 10 having a transparent base 1 provided with minute irregularities 2 and formed of a single material can be formed by an injection molding process. A cover plate 10 having a two-layer transparent base 1 can be formed by simultaneously laminating a hardening-resin layer of an ionizing-radiation-hardening resin or the like and a layer provided with a minute irregularities to the back surface of a glass or transparent resin plate by a 2P process or a two-color injection molding process using a two-color injection molding machine. Those processes mentioned above use a shaping mold provided with minute irregularities for forming the minute rough layer.

Method of Making Minute Irregularity Forming Mold

The minute irregularities 2 can directly be formed in each of shaped blanks for forming transparent bases 1 to be used as cover plates 10 by individually processing the blanks. However, it is preferable, in view of mass-producing cover plates, i.e., industrial products, efficiently at low costs, to form a mother shaping mold and to use the mother shaping mold for shaping the blanks for transparent bases, or to form a plurality of master shaping molds by using the mother shaping mold and to use the plurality of master shaping molds for mass-producing shaped transparent bases. The minute irregularities 2 can be formed in transparent bases 1 by various shape-duplicating processes using the mother shaping mold or the master shaping molds to obtain cover plates 10, i.e., end products. Irregularities complementary to those of the minute irregularities 2 can be formed by a microstructure forming method used in the semiconductor industry. Normally, sidewalls of minute projections of semiconductor devices are perpendicular to the surface of the substrate and do not need to extend obliquely to the surface of the substrate. However, a microstructure forming method of forming the minute irregularities 2 of the present invention must be capable of forming the projections of the minute irregularities 2 having sides inclined to the surface of the transparent base 1.

Electron beam lithography is one of such microstructure forming methods. When forming the minute irregularities 2 by an electron beam lithography, a resist layer 12 is formed on a glass substrate 11 as shown in FIG. 10(A), and a resist pattern 12a as shown in FIG. 10(B) is formed by exposing and developing the resist layer 12 by the electron beam lithography for patterning. Then, the surface of the glass substrate 11 is subjected to a dry etching process or the like using the resist pattern 12a as an etching mask to form minute irregularities (mold minute irregularities) 15 shown in FIG. 10(C). Then, the resist pattern 12a is removed to obtain a mold 11a having the minute irregularities (mold minute irregularities) 15 as shown in FIG. 10(D). During this etching process, inclined sidewalls of features of the minute irregularities 15 are formed by side etching. Although the resist pattern 12a formed directly on the glass substrate 11 may be used as an etching mask for etching the glass substrate 11, it is preferable to use a metal pattern as an etching mask. The metal pattern can be formed by forming a metal layer of chromium or the like on the glass substrate 11, forming a resist film over the metal layer, processing the resist film to form a resist pattern, and patterning the metal layer by using the resist pattern as a mask.

The resist film 12 can be patterned by electron beam lithography or laser beam lithography. The laser beam lithography may employ laser interferometry which is applied to making a diffraction grating. The grooves of a diffraction grating are arranged linearly. A diffraction grating having two-dimensionally arranged grooves can be formed by multiple exposure at different angles. Usually, minute irregularities formed by using Laser interferometry have regularly arranged projections. Electron beam lithography stores digital data representing predetermined pattern information in a storage device, turns on and off or modulates a scanning electron beam according to the digital data. Therefore, electron beam lithography is applicable to both forming minute irregularities having regularly arranged projections and forming minute irregularities having irregularly arranged projections. Laser interferometry, analogous with laser beam lithography, is subject to a restriction on the directivity of the laser beam and has difficulty in stably patterning a wide area. Electron beam lithography is free from such a problem in laser interferometry.

The mold 11a thus obtained may directly be applied to forming the transparent base 1 having the minute irregularities 2. However, it is usual to use the mold 11a as a mother mold for the mass production of transparent bases 1. The transparent base 1 is formed by a duplicating process, such as an injection molding process, an embossing process (hot-pressing process) or a 2P process (photopolymerization process). Although the mother mold may directly be used for duplication, usually a master mold formed by duplicating the mother mold is used for duplication. An injection molding process, which is employed in a making method according to the present invention, is an excellent process capable of simultaneously forming a transparent base and minute irregularities, and suitable for mass-producing cover plates.

The master mold is made by a known method, such as a method that plates the mother mold with a metal, such as nickel, to form a metal layer, and peels the metal layer from the mother mold to obtain a metal master mold (electroforming process). The metal master mold is plated to obtain a master mold. The mold for forming minute irregularities on a transparent base may have the shape of a plate, a sheet or a cylinder.

Method of Forming Minute Irregularities

There are various methods of making the cover plate 10 provided with the minute irregularities 2 according to the present invention. The present invention uses an injection molding process. The minute irregularities 2 are formed by an injection molding process using an injection molding machine provided with an injection mold having a surface provided with minute irregularities complementary to those of the minute irregularities 2. This injection molding process is capable of simultaneously forming the transparent base 1 of a resin and the minute irregularities 2, and of efficiently mass-producing cover plates. The minute irregularities complementary to those of the minute irregularities 2 can be formed on the surface of the injection mold by attaching the master mold formed by the foregoing processes to the surface of the injection mold.

Other Components

The cover plate 10 of the present invention for the display device 100 has the transparent base 1 provided on its back surface with the minute irregularities 2 and not provided on in its front surface with any minute irregularities. When necessary, the cover plate 10 of the display device 100 may be additionally provided with other conventional components.

For example, a known single-layer or multilayer antireflection film may be formed on the front surface of the cover plate 10. Antiglare irregularities capable of diffusing light may be formed on the front surface of the cover plate 10. A known hard coating film may be formed on the front surface of the cover plate 10 to protect the surface from damage, whether an antireflection layer is formed on the front surface of the cover plate 10 or not. Formation of the antireflection layer over a hard coating layer is effective.

A decorative layer including a frame, characters, symbols, logos and/or decorative patterns may be formed on part of the front surface, the back surface, or the front and the back surface of the cover plate 10 so that the decorative layer may not interfere with images displayed on the display panel. Preferably, the hard coating layer is formed over the decorative layer to protect the latter.

Figure 8:
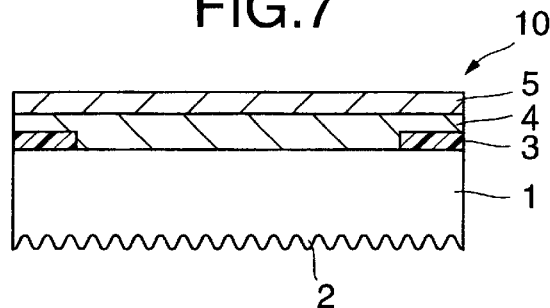
FIG. 8 is a typical sectional view of a cover plate in another modification.

A cover plate 10 shown in a sectional view in FIG. 8 has a transparent base 1 and a decorative layer 3 formed in a peripheral part of the front surface of the transparent base 1. The front surface of the transparent base 1 including the decorative layer 3 is covered with a hard coating layer 4. An antireflection layer 5, which is not analogous with the minute irregularities characteristic of the present invention, is formed on the hard coating layer 4. Minutely irregularities 2 characteristic of the present invention are formed on the back surface of the transparent base 1. The shape of the cover plate 10 is dependent on uses. The cover plate 10 may be a flat plate, a three-dimensional member or a curved plate.

Display Device

The display device 100 of the present invention is formed by disposing the display panel 30 behind the cover plate of the present invention. The front surface of the display panel 30 is spaced apart from the back surface of the cover plate 10 by a gap instead of being closely bonded to the back surface of the cover plate 10 with an adhesive, because the reflection-reducing ability of the minute irregularities 2 characteristic of the present invention is scarcely effective if the display panel 30 is bonded closely to the cover plate 10.

Although the display device 100 may be included in a display unit of an information display system simply having a displaying function, such as an information board or a guide board, the display device 100 may be included in a display unit of devices for which the displaying function is one of its various functions, such as portable telephones and music players.

Figure 9:
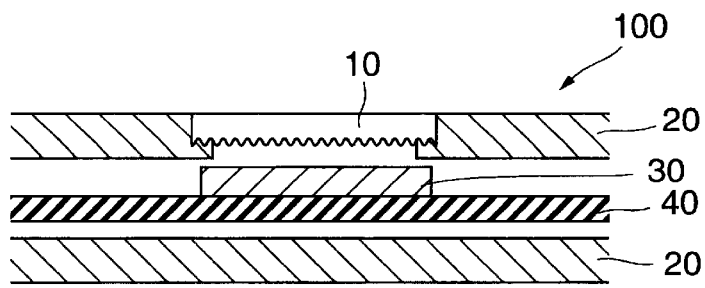
FIG. 9 is a typical sectional view of a display device.

FIG. 9 is a sectional view showing an essential part of the display device 100. FIG. 9 is a conceptual sectional view of, for example, of a part of a portable telephone around the display device 100. As shown in FIG. 9, the cover plate 10 of the display device 100 is bonded with an adhesive or the like to a case 20 containing the display device 100 so as to cover an opening formed in the case 20 with its front surface facing outside and its back surface provided with the minute irregularities 2 facing inside. The display panel 30, i.e., a flat panel display, such as an LCD, is fixedly mounted on a wiring board 40 at a position corresponding to the cover plate 10 so as to be spaced from the back surface of the cover plate 10. The back surface of the wiring board 40 is spaced from the back wall of the case 20.

Uses of the Cover Plate of the Display Device

The cover plate 10 of the present invention included in the display device 100 can be used as a cover plate 10 for various display devices; that is, the cover plate 10 can be used as the cover plate 10 of a display unit of various display devices 100. The display device 100 is provided, as the display panel 30, with, for example, an LCD (liquid crystal display), an ELD (electroluminescent display), a PDP (plasma display panel) or the like. The present invention is particularly suitable for application to LCDs because LCDs are not self-luminescent and hence relatively subject to the deterioration of displaying performance by external light and the effect of the present invention on suppressing the deterioration of displaying performance of LCDs is very significant. Display devices 100 according to the present invention include mechanical display devices, such as mechanical analog meters represented by watches having a dial and hands.

Articles provided with the display device 100 include portable telephones, personal computers, portable music players including CD players, DVD players, MD players and semiconductor memory music players, and electronic devices including video tape recorders, IC recorders, video cameras, label printers and the like. The display device 100 can also be used in electronic devices including PDAs (personal digital assistants), notebook-size personal computers, digital cameras and the like, and electric utensils including electric rice cookers, electric pots, washing machines and the like.

EXAMPLE 1-1

A resist layer was formed on a glass substrate by a spin coating process. The resist layer was irradiated twice with laser beams emitted by argon ion lasers and falling thereon at an angle of 50° from two directions, in which the glass substrate was held at a first position and at a second position at an angle of 90° from the first position. The exposed resist layer was developed using a developer to form a resist pattern.

Then, the glass substrate was etched by a dry etching process using the resist pattern to obtain a mother mold, i.e., the glass substrate provided with desired minute irregularities. A nickel mold, i.e., a master mold, was made by subjecting the mother mold to an electroforming process, which is used by a compact disk making line or the like.

The master mold was attached to a surface of an injection mold, a transparent acrylic resin was injected into the injection mold by an injection molding machine to form a flat, transparent base and desired minute irregularities simultaneously to obtain a cover plate for a display device, having the transparent base and the minute irregularities formed on the back surface of the transparent base.

It was found through the observation of the back surface of the cover plate with an atomic force microscope that projections as shown in FIG. 2 were arranged regularly in a square grid, the minimum height $H_{MIN}$ of the projections of the minute irregularities was 100 nm, and pitches between the projections were in the range of 300 to 380 nm.

Light rays were projected on the cover plate at an incident angle of 5° by a spectrophotometer to measure the reflectance of the cover plate. The back surface of the cover plate had very a low reflectance in the range of about 0.1 to about 1% for light rays of wavelengths in the range of 380 to 640 nm.

The cover plate having the low reflectance was used for covering the liquid crystal panel of the LCD of a portable telephone. The clearness of images displayed on the liquid crystal panel covered with this cover plate were far higher than that of images displayed on a liquid crystal panel covered with a cover plate of an acrylic resin not having any reflection-reducing function.

(1) The cover plate of the present invention for a display device is capable of reducing reflection of light on its back surface. Thus, light rays reflected by the back surface of the cover plate among light rays reflected toward the user by the front and the back surface of the cover plate among external light rays that affect the visibility of a displayed image can be eliminated and hence the total amount of the light rays reflected by the cover plate can be reduced accordingly. Therefore, the deterioration of visibility by the reflected external light can be reduced. Since the specific minute irregularities are formed only on the back surface of the cover plate and is not formed in the front surface of the same, the reduction of the reflection-reducing effect of the minute irregularities due to the abrasion of the minute irregularities and soiling of the minute irregularities with oil, i.e., filling of the valleys with oil, does not occur.

In a display device provided with the cover plate of the present invention, reflection of display light (image light) emitted by a display panel disposed behind the cover plate by the back surface of the cover plate can be reduced. Thus, the reduction of contrast in the displayed image and the resultant whitening can be prevented, and the visibility of the displayed image can be improved. Since visibility is improved, the power demand of the back light or front light of the liquid crystal panel or the power demand of the display panel, such as an EL panel can be reduced, which contributes to the reduction of power demand and power consumption.

(2) The reflection-reducing effect of the specific minute irregularities can be enhanced by forming the minute irregularities such that the relation between the pitches between the projections of the minute irregularities and the refractive index of the transparent base meets special conditions.

(3) The method of making a cover plate for a display device, according to the present invention using the mold formed by electron beam lithography is capable of easily mass-producing cover plates provided with the specific minute irregularities. The method using electron beam lithography, as compared with a method using laser beam lithography, is easy to carry out for patterning a wide area under stable patterning conditions.

(4) The method of making a cover plate for a display device, according to the present invention using the mold formed by laser beam lithography is capable of easily mass-producing cover plates provided with the specific minute irregularities.

(5) The method of making a cover plate for a display device, according to the present invention using an injection molding machine having an injection mold provided with the master mold provided with minute irregularities complementary to the minute irregularities is capable of simultaneously forming the transparent base and the minute irregularities of the same material, and hence is suitable for mass-producing cover plates at a low cost.

(6) The display device of the present invention is able to enjoin the effects of the cover plate stated in (1) and (2). Consequently, the visibility of images displayed by the display device is improved, the display device requires reduced energy, and the power consumption of the display device can be reduced.

Second Embodiment

A second embodiment of the present invention will be described hereinafter.

Outline

Figure 11:
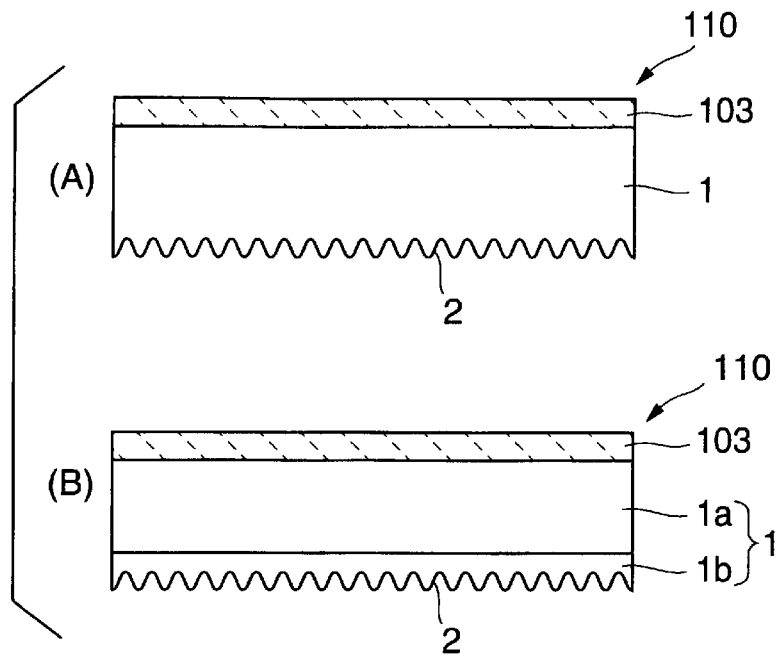
FIGS. 11(A) and 11(B) are typical sectional views of a reflection-reducing structure in a second embodiment according to the present invention.

FIG. 11(A) shows a low-reflection structure 110 in a second embodiment according to the present invention in a typical sectional view. The low-reflection structure 110 has the shape of a flat plate or a sheet. Both the outer surface, i.e., the upper surface as viewed in FIG. 11(A), and the inner surface, i.e., the lower surface, as viewed in FIG. 11(A) have a reflection-reducing function. The outer and the inner surface are parallel to each other. The outer surface is liable to be soiled with dirt from the hands, dust and soil. The inner surface faces the interior of a device, is not touched easily with the hands and is not soiled easily with dirt and soil.

Referring to FIG. 11(A), the low-reflection structure 110 has a transparent base 1 provided on its inner surface with reflection-reducing minute irregularities 2 having minute irregularities, and an antireflection film 103 formed on the outer surface of the transparent base 1. The antireflection film 103 does not have minute irregularities. The antireflection film 103 is a single-layer film having a low refractive index or a multilayer film consisting of a low-refraction layer and a high-refraction layer.

Thus, the minute irregularities 2 are formed on the inner surface of the transparent base 1 of the low-reflection structure 110, any irregularities like the minute irregularities 2 are not formed on the outer surface, which is liable to be damaged and soiled, of the transparent base 1 of the low-reflection structure 110, and the antireflection film 103 is formed on the outer surface of transparent base 1 of the low-reflection structure 110. The combined reflection-reducing function of the minute irregularities 2 and the antireflection film 103 is more effective than the reflection-reducing function of only the minute irregularities 2. Since the antireflection film 103 is more resistant to damaging and soiling than the minute irregularities 2, the reflection-reducing effect of the low-reflection structure 110 does not easily decrease.

Although the transparent base 1 of the low-reflection structure 110 shown in FIG. 11(A) is a single-layer member, the transparent base 1 may be a multilayer member. For example, a low-reflection structure 110 shown in FIG. 11(B) has a transparent base 1 consisting of a transparent main part 1a and a reflection-reducing part 1b provided with minute irregularities 2.

Minute Irregularities

The minute irregularities 2 have an antireflection effect because of the following reasons.

The minute irregularities 2 are capable of making the change of refractive index at the interface between the transparent base 1 and its external environment (air) gradual and continuous, which otherwise is sudden and discontinuous. Since reflection of light is a phenomenon that occurs when refractive index changes suddenly and discontinuously at the interface between mediums, reflection of light by the surface of a structure can be reduced by making refractive index change gradually and continuously at the interface between the mediums.

The transparent base 1 provided with the minute irregularities 2 of the second embodiment may be similar to that of the first embodiment, and hence the further description of the transparent base 1 provided with the minute irregularities 2 will be omitted.

The shape of the transparent base 1 is dependent on the uses of the low-reflection structure 110, and may be the shape of a flat plate as shown in FIG. 11(A) or the shape of a flat, flexible sheet. The transparent base 1 does not necessarily need to be rigid. Usually, both the surfaces of the flat transparent base 1 are antireflection surfaces, which, however, is not requisite. The transparent base 1 may be a three-dimensional member; that is, the reflection-reducing structure 110 may be a three-dimensional structure. When used as a cover plate for covering a display unit, the reflection-reducing structure 110 may have a flat reflection-reducing part, and a peripheral part surrounding the flat reflection-reducing part and provided with ribs or the like for connecting the low-reflection structure 110 to a mount. When the transparent base 1 has the shape of a flat plate, the thickness of the same as intended for use as a cover plate for a display unit or the like is, for example in the range of abut 0.5 to about 2 mm.

Although it is easy to form a surface of the transparent base 1 provided with the minute irregularities 2 in a flat surface, the same surface is not limited to a flat surface. A surface of the transparent base 1 coated with the antireflection film 103 may be either a flat surface or a curved surface.

The minute irregularities 2 are parts of the transparent base 1. The transparent base 1 and the minute irregularities 2 may be formed integrally of the same material as those of the low-reflection structure 110 shown in FIG. 11(A). The transparent base 1 may be a two-layer structure consisting of the transparent main part (transparent body) 1a, and the reflection-reducing part (minute irregularities) 1b provided with the minute irregularities 2 as those of the transparent base 1 of the low-reflection structure 110 shown in FIG. 11(B). When the transparent base 1 is formed integrally of the same material, the transparent base 1 and the minute irregularities 2 can simultaneously be formed of a resin by injection molding. When the transparent base 1 is a two-layer structure consisting of the transparent main part 1a, and the reflection-reducing part 1b provided with the minute irregularities 2, the reflection-reducing part 1b can be laminated to a surface of a shaped glass or resin plate as the transparent main part 1a of the transparent base 1 by simultaneously depositing a hardening resin layer of an ionizing-radiation-hardening resin on the surface of the glass or resin plate and shaping the hardening resin layer by a 2P process (photopolymerization process). The transparent base 1 of two-layer construction can be formed by an insert injection molding process or a two-color injection molding process. Those molding processes use a shaping mold provided with minute irregularities complementary to the minute irregularities 2.

Method of Making Minute Irregularity Forming Mold

A minute irregularity forming mold for forming the minute irregularities 2 on the transparent base 1 will be explained.

The minute irregularities 2 can directly be formed in each of shaped blanks for forming transparent bases by a process that processes the blanks individually (JP-A No. 70040/ 1975). This process has no problem when applied to making a single low-reflection structure 110 or a small number of low-reflection structures 110. However, this problem has problems when applied to mass-producing low-reflection structures 110; this process needs much time for producing a large number of low-reflection structures 110 and the reflection-reducing structures produced by this process is costly. Therefore it is preferable, in view of industrial productivity and costs, to form a shaping mold and to use the shaping mold for forming the minute irregularities.

It is preferable not to use an original mold provided with minute irregularities directly formed therein and to use a duplicate mold formed by a duplicating process including one or a plurality of cycles of embossing and inversion. Such a duplicate mold is formed by making an original mold, i.e., mother mold, performing a duplicating process for duplicating the original mold once of a plurality of times to form a duplicate mold, i.e., a master mold. The duplicate mold is used as a shaping mold. A process using this duplicate mold as a shaping mold is excellent in industrial productivity and costs. A duplicate mold can readily be made to replace a duplicate mold being used when the duplicate mold being used is damaged.

Figure 10:
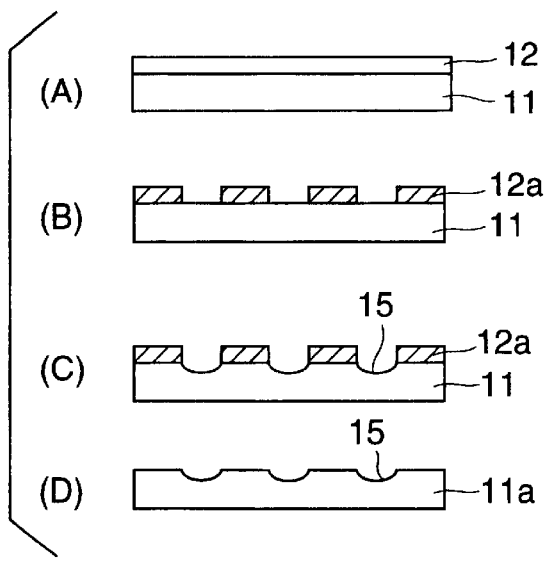
FIGS. 10(A) to 10(D) are views of a workpiece in different steps of a method of making a cover plate provided with minute irregularities.

Basically, there are not particular restrictions on the method of making the original mold for forming the duplicate mold, provided that the method is capable of forming the minute irregularities in the original mold, and a suitable method may be selectively determined taking into consideration productivity, costs and such. When making an original mold, irregularities complementary to those of the minute irregularities 2 can be formed by a microstructure forming method used in the semiconductor industry as shown in FIG. 10. The microstructure forming method may use electron beam lithography or laser-beam lithography for patterning. Normally, sidewalls of minute projections of semiconductor devices are perpendicular to the surface of the substrate and do not need to extend obliquely to the surface of the substrate. However, a microstructure forming method of forming the minute irregularities 2 of the present invention must be capable of forming the projections of the minute irregularities 2 having sides inclined to the surface of the transparent base 1.

The duplicate mold to be used as a master mold can be formed by duplicating the original mold by a known method, such as a method that plates the original mold with a metal, such as nickel, to form a metal layer, and peels the metal layer from the original mold to obtain a metal duplicate mold (electroforming process). A duplicate mold may be made by repeating a duplicating process a plurality of times, in which the duplicate mold obtained by the foregoing electroforming process is plated to obtain another duplicate mold. A shaping mold employed by a photopolymerization process has the shape of a plate, a sheet, a block or such, and the shape of the shaping mold may be determined according to the shape and uses of the reflection-reducing structure to be manufactured. The shaping mold may be formed of either a meal, such as nickel, or a resin, such as a silicone resin. For example, a shaping mold of a resin having the shape of a continuous web is possible.

Minute irregularities 2 can be formed (duplicated) on a transparent base 1 by using the shaping mold thus made by a known duplicating method, such as a hot-pressing process (embossing process), an injection molding process, a 2P process (photopolymerization process) or a sol-gel transformation process, a laminating process using a minutely surface-roughened sheet or a minute irregularity transfer process. A suitable process may selectively be determined, taking into consideration the uses of the low-reflection structure and the material of the transparent base.

A hot-pressing process (embossing process), a 2P process, a sol-gel transformation process, a laminating process using a minutely surface-roughened sheet, and a minute irregularity transfer process and a minute irregularity transfer process are suitable for forming minute irregularities 2 on a shaped transparent base 1. A hot-pressing process (embossing process) is suitable when the transparent base 1 is formed of a thermoplastic resin capable of plastic deformation. A 2P process, a laminating process using a minutely surface-roughened sheet (or a plate), and a minute irregularity transfer process are suitable when the transparent base 1 is formed of an inorganic material, such as glass. A sol-gel transformation process is suitable when the transparent base 1 is formed of a heat-resistant inorganic material, such as glass.

A sol-gel transformation process, such as disclosed in JP-A No. 64907/1994, applies a composite material containing a metal alkoxide and a polyethylene glycol as a thickener to a transparent base 1 in a film of the composite material, forms irregularities in the film of the composite material by embossing while the film is soft, and dries and heat-treats the embossed film to complete a film of an inorganic material provided with minute irregularities.

The minutely surface-roughened sheet (or plate) is a resin sheet (or plate) provided with minute irregularities formed in is surface by a process using the foregoing shaping mold. The resin forming the minutely surface-roughened sheet (or plate) may be one of the resins mentioned previously as suitable materials for forming the transparent base. The minutely surface-roughened sheet (or plate) is bonded to the transparent base with an adhesive or by thermal welding.

A minute irregularity transfer process uses a transfer sheet having a supporting sheet and a transfer layer laminated to the supporting sheet. The transfer layer is provided with minute irregularities on its surface contiguous with the supporting sheet. The transfer layer is transferred to a transparent base to form the minute irregularities on the transparent base. Therefore, the supporting sheet has a surface contiguous with the transfer layer and provided with irregularities complementary to the minute irregularities. The foregoing minutely surface-roughened sheet or the like is used as the supporting sheet. The transfer layer is formed on the supporting sheet by spreading a coating liquid containing a transparent resin. The transparent resin is a thermoplastic resin, such as an acrylic resin, a thermosetting resin, such as a urethane resin, an ionizing-radiation-hardening resin, such as an acrylate resin hardening with ultraviolet radiation or electron beams.

A process of simultaneously forming the transparent base 1 and the minute irregularities 2 is an injection molding process or a 2P process.

The injection molding process uses an injection mold having a surface provided with minute irregularities complementary to the minute irregularities 2. The injection molding process capable of simultaneously molding the transparent base 1 and the minute irregularities 2 with a resin is a very efficient reflection-reducing structure mass-producing method. The minute irregularities for forming the minute irregularities 2 may be formed on the surface of the injection mold by attaching the shaping mold formed by the foregoing processes to the surface of the injection mold.

The 2P process forms the transparent base 1 and the minute irregularities 2 simultaneously.

When a process forms the transparent base 1 and the minute irregularities 2 simultaneously, the transparent base 1 may be formed of glass. Since heated glass is capable of plastic deformation, the transparent base 1 and the minute irregularities 2 can be formed simultaneously by a hot pressing process.

The low-reflection structure having the transparent base 1 integrally combined with the minute irregularities 2 as shown in FIG. 11(A) can be made by a hot pressing process (embossing process), an injection molding process or a 2P process. The low-reflection structure having the laminated transparent base 1 consisting of the transparent main part 1$a$ and the reflection-reducing part 1$b$ provided with the minute irregularities 2 and laminated to the transparent main part 1$a$ as shown in FIG. 11(B) can be made by an injection molding process, which forms the transparent main part 1$a$ and the reflection-reducing part 1$b$ by a two-color injection molding process, a 2P process, a sol-gel transformation process, a laminating process using a minutely surface-roughened sheet (or plate) or a minute irregularity transfer process.

When making the transparent base 1 by a 2P process or a minute irregularity transfer process, the reflection-reducing part 1$b$ may be formed of any type of resin, provided that the resin is transparent. Hard resins, such as thermosetting resins including urethane resins and epoxy resins, and ionizing-radiation-hardening resins including acrylate resins are preferable materials for forming a reflection-reducing part 1$b$ resistant to scratching.

When necessary, an adhesive layer may be interposed between the transparent main part 1$a$ and the reflection-reducing part 1$b$ to bond together the reflection-reducing part 1$b$ and the transparent main part 1$a$. The adhesive layer may be formed of a known adhesive or a silane coupling agent.

Antireflection Film

The principle of reflection reduction of the antireflection film 103 is different from that of the minute irregularities characteristic of the present invention. The antireflection film 103 is of one of generally known reflection-reducing systems excluding an antiglare system that uses a satin-finished surface having irregularities of a scale not smaller than wavelengths of light to reduce regular reflection of light by diffusing light by the satin-finished surface. The antiglare system is excluded because the present invention intends to achieve both reducing the reflection of light and improving transmittance, and the use of the antiglare system for reducing the reflection of light reduces transmittance. Concretely, the antireflection film 103 is a single low-refraction film having a low refractive index or a multilayer film including at least one low-refraction layer having a low refractive index. Although a single low-refraction film as the antireflection film 103 has a proper reflection-reducing effect, a dielectric multilayer film formed by alternately superposing low-refraction layers and high-refraction layers so that the outermost layer is the low-refraction layer can be used as the antireflection film 103. The dielectric multilayer film reduces reflection by the agency of optical interference.

Those representative of the low-refraction layers and high-refraction layers of the dielectric multilayer film are metal oxide thin films.

Generally, films having a refractive index, for example, not less than 1.5 are used as the high-refraction layers. Possible metal oxides for forming the high-refraction layers are ZnO (1.90), $TiO_2$ (2.3 to 2.7), $CeO_2$ (1.95), $Sb_2O_5$ (1.71), $SnO_2$ (1.997), $In_2O_3$ (2.00), $Y_2O_3$ (1.87), $La_2O_3$ (1.95), $Al_2O_3$ (1.63), $HfO_2$ (2.00), $ZrO_2$ (2.05) and ITO (indium-tin oxide) (1.95), in which values in parentheses are refractive indices. Metal oxides having high refractive indices in the range of 1.78 to 2.4, such as ITO $TiO_2$, $SnO_2$, $In_2O_3$, $ZrO_2$ and mixtures of some of those, are particularly preferable.

Films having a refractive index in the range of 1.42 to 1.51 are used as the low-refraction layers. Possible metal oxides for forming the low-refraction layers are $SiO_2$, SiO, $SiO_x$ (x<2) and silica containing methyl groups. A film of silica containing methyl groups can be formed by a plasma CVD process using an organic silicon compound containing methyl groups, such as hexamethyldisiloxane (HMDSO), and tetramethyldisiloxane (TMDSO), as a source gas (JP-A No. 338307/2000).

The low-refraction and the high-refraction layers are formed by a known thin film forming process, such as a sputtering process, a plasma CVD process or the like.

An example of the dielectric multilayer film consists of ITO films (refractive index: 2.002) as high-refraction layers, and $SiO_2$ films (refractive index: 1.452) as low-refraction layers. The arrangement of the component layers of the dielectric multilayer film is, from the side of the transparent base, 25 nm thick ITO film/25 nm thick $SiO_2$ film/85 nm thick ITO film/92 nm thick $SiO_2$ film. Those films are formed by sputtering processes.

The arrangement of the component layers of another example of the dielectric multilayer film is, from the side of the transparent base, 25 nm thick ITO film/25 nm thick $SiO_2$ film/85 nm thick ITO film/95 nm thick silica film. Those films excluding the silica film are formed by sputtering processes and the silica film is formed by a plasma CVD process.

The antireflection film 103 is a single-layer thin film of a material having a low refractive index, such as magnesium fluoride or silicon dioxide or a film of an antireflection coating prepared by dispersing powder of a low-refraction material in a resin binder.

A hard coat layer may be used to increase the surface strength of the antireflection film 103, and a primer layer may be used to ensure the close adhesion of the antireflection film 103 to the transparent base 1. It is preferable, in view of reflection reduction, to interpose a hard coat layer between the antireflection film 103 and the transparent base 1. A primer layer is interposed between the antireflection film 103 and the transparent base 1. When a hard coat layer is used, a primer layer is interposed between the hard coat layer and the transparent base 1 or between the hard coat layer and the antireflection film 103, or primer layers are interposed between the hard coat layer and the transparent base 1 and between the hard coat layer and the antireflection film 103, respectively.

The hard coat layer may be a known one suitable for uses. The hard coat layer is a cross-linked hard layer of a hardening resin, such as one of thermosetting resins including urethane resins and epoxy resins, or one of ionizing-radiation-hardening resins including acrylate resins hardening with ultraviolet radiation or electron beams.

Uses of Low-reflection Structure

The low-reflection structure 110 of the present invention may be a three-dimensional member, a film (or sheet) or a plate. There are not any particular restrictions on the use of the low-reflection structure 110. Since the reflection-reducing minute irregularities 2 are very fine, it is desirable to handle the low-reflection structure 110 attentively so as not to damage or soil the minute irregularities 2. Therefore it is preferable to use the low-reflection structure 110 with the minute irregularities 2 facing inside and the antireflection film 103 facing outside. Uses of the present invention is not limited to those which will be mentioned below.

For example, the low-reflection structure 110 is used as a cover plate for covering the display units of various devices, such as portable telephones. In such a display unit, a plate or a cover plate formed by molding a resin is disposed in front of a display panel, such as an LCD. When the low-reflection structure 110 is used as such a cover plate, it is desirable that the antireflection film 103 faces outside and the minute irregularities 2 characteristic of the present invention face inside. The display unit may be a mechanical means such as a mechanical analog meter, typically a watch, instead of a display panel, such as an LCD.

The cover plate having the shape of a flat plate may be provided in its peripheral part with projections for attaching the cover plate to a relevant structure or for aesthetic effects.

Devices having a display unit covered with a cover plate include, in addition to portable telephones and watches, personal computers, PDAs or portable remote terminals including notebook-size personal computers, electronic calculators, portable music players including CD players, DVD players, MD players and semiconductor memory music players, electronic devices including video tape recorders, IC recorders, video cameras, digital cameras and label printers, and electric utensils including electric rice cookers, electric pots, washing machines and the like.

The low-reflection structure 110 in the shape of a film (or sheet) or a plate can be used as a transparent electrode film or a transparent plate for a transparent touch panel or the like. A transparent touch panel is used to add an input function to a display unit. Since a display panel, such as an LCD or a CRT, and a transparent touch panel are separate components of an assembly, a gap is formed inevitably between the display panel and the transparent touch panel and hence light is reflected. Such reflection of light can be reduced by using the low-reflection structure 110 including the transparent base 1 provided on its inner surface with the minute irregularities 2 characteristic of the present invention, and the antireflection film 103 as the transparent touch panel.

Transparent touch panels are employed in, for example, PDAs or portable remote terminals including electronic notebook-size computers, car navigation systems, POS terminals (point-of-sale terminals), portable order input terminals, ATMs (automatic teller machines), facsimile equipment, stationary telephones, portable telephones, digital cameras, video cameras, personal computers, displays for personal computers, television receivers, television monitors, ticket-vending machines, measuring instruments, electronic devices including electronic calculators and electronic musical instruments, business machines including copying machines and ECRs (electronic cash resisters), and electric utensils including washing machines, electronic ranges and the like.

The low-reflection structure of the present invention can be applied also to various optical devices.

Examples of the present invention will be described hereinafter.

EXAMPLE 2-1

A low-reflection structure 110 of construction as that shown in FIG. 11(B) was fabricated by the following processes.

To make a shaping mold for forming minute irregularities, a 600 nm thick resist layer of a photosensitive resin (Microposit S1805 commercially available from Sipley Co., Inc.) was formed on a 3 mm thick glass substrate by a spin coat process. The resist layer was irradiated twice with laser beams emitted by argon ion lasers and falling thereon at an angle of 50° from two directions, in which the glass substrate was held at a first position and at a second position at an angle of 90° from the first position. The exposed resist layer was developed using a developer (Developer CONC commercially available from Sipley Co., Inc.) to obtain a desired resist pattern. Thus, an original mold (mother mold) including the glass substrate and the resist pattern formed on the glass substrate was obtained.

Then, the mother mold was electroplated with nickel to obtain an 80 μm thick nickel-plated plate as a master mold.

A dielectric multilayer film as an antireflection film 103 was formed on an 80 μm thick triacetyl cellulose film (TAC film) as a transparent main part 1a of a transparent base 1. The construction of the antireflection film 103 was, from the outer side, 100 nm thick $SiO_2$ film/40 nm thick ITO film/80 nm thick $SiO_2$ film. Those component films of the antireflection film 103 were formed by sputtering processes.

A reflection-reducing part 1b having minute irregularities 2 was formed of an ultraviolet-curable resin on the inner surface of the transparent main part 1a by a 2P process, in which the ultraviolet-curable resin was applied in a film of 2 g/m² to the inner surface of the transparent main part 1a by potting, the master mold was pressed against the ultraviolet-curable resin film, the ultraviolet-curable resin film was irradiated through the transparent main part 1a with ultraviolet radiation emitted by a high-pressure mercury lamp for the photopolymerization of the ultraviolet-curable resin, and then the master mold was removed to complete the reflection-reducing part 1b. Thus, a low-reflection structure 110 having the shape of a sheet was obtained.

It was found through the observation of the minute irregularities 2 of the low-reflection structure 110 with an atomic force microscope that projections as shown in FIG. 2 were arranged regularly in a square grid, the minimum height $H_{MIN}$ of the projections of the minute irregularities was 200 nm, and the maximum pitch $P_{MAX}$ among those between the projections was 300 nm.

Comparative Example 2-1

A low-reflection structure in Comparative example 2-1 was the same in construction as the low-reflection structure 110 in Example 2-1, except that the former was not provided with any part corresponding to the minute irregularities 2 and was provided with only an antireflection film.

Performance Evaluation

The transmittance (visual transmittance) and reflectance (visual reflectance) of the low-reflection structures in Example 2-1 and Comparative example 2-1 were measured.

The low-reflection structure 110 in Example 2-1 had a transmittance of 98.4% and a reflectance of 0.6%, while the low-reflection structure in Comparative example 2-1 not provided with minute irregularities had a transmittance of 95.2% and a reflectance of 4.0%. Thus, the low-reflection structure in Comparative example 2-1 was inferior in both transmittance and reflectance to that in Example 2-1. It was found that the low-reflection structure in Example 2-1 did not diffuse light and the transmittance of the low-reflection structure in Example 2-1 was improved accordingly.

Both the minute irregularities and antireflection film of the low-reflection structure of the present invention are effective in reducing reflection, and hence the reflection-reducing performance of the same is higher than that of a low-reflection structure provided with only minute irregularities. Transmittance increases in proportion to the reduction of reflectance. Therefore, the low-reflection structure as used as a cover plate for covering the display unit, such as a display, improves the visibility of images displayed by the display unit and enhances light utilization efficiency.

Third Embodiment

A low-reflection structure 110 in a third embodiment according to the present invention will be described.

Outline

Figure 12:
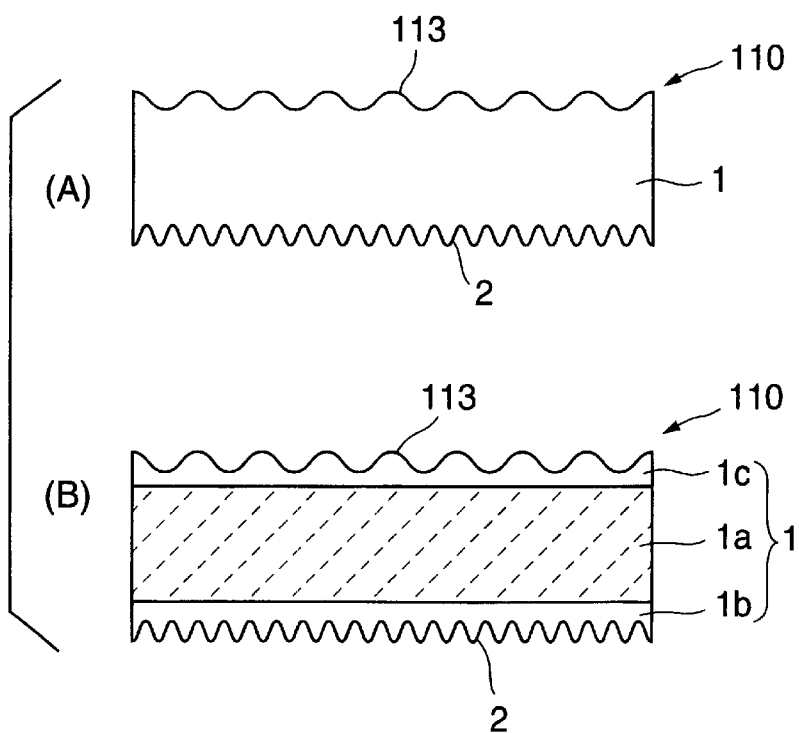
FIGS. 12(A) and 12(B) are typical sectional views of a reflection-reducing structure in a third embodiment according to the present invention.

FIG. 12(A) is a sectional view of the low-reflection structure 110 in the third embodiment. The low-reflection structure 110 shown in FIG. 12(A) has a shape generally resembling a flat plate or a sheet. Both the front surface, i.e., an upper surface as viewed in FIG. 12(A), and the back surface, i.e., a lower surface as viewed in FIG. 12(A), of the low-reflection structure 110 are capable of reducing reflection, and the front and the back surface are parallel to each other. The low-reflection structure 110 is used as, for example, a cover plate of a display unit.

Referring to FIG. 12(A), the low-reflection structure 110 has a transparent base 1 provided with reflection-reducing minute irregularities 2 on aback surface, and antiglare irregularities 113 including projections arranged at pitches greater than the wavelengths in the visible region on a front surface.

The projections arranged of the antiglare irregularities 113 at pitches greater than the wavelengths in the visible region diffuse light to reduce the reflection of light.

The minute irregularities 2 characteristic of the present invention differ from the antiglare irregularities 113 in that the same include projections arranged at pitches not greater than the wavelengths in the visible region. The minute irregularities 2 do not diffuse light and have a reflection-reducing effect that increases transmittance.

In the description of the present invention, an upper surface and a lower surface, as viewed in the drawings, of the reflection-reducing structure 110 will be referred to as an outer surface and an inner surface, respectively. The outer surface faces outside when the low-reflection structure is used on a device and is liable to be soiled with dirt from the hands, dust and soil. The inner surface faces the interior of the device, is not touched easily with the hands and is not soiled easily with dirt and soil. When the outer and the inner surface or the front and the back surface of an object do not need to be discriminated from each other, those surfaces will be referred to inclusively as "surface". If the low-reflection structure 110 has a general shape resembling a plate, and two parallel surfaces in the front-and-back relation, those surfaces will be referred to as front and back surfaces. The front surface faces outside and the back surface faces inside when the low-reflection structure is used on a device. In an object having a shape resembling a plate, the outer surface is the front surface, and the inner surface is the back surface. In some three-dimensional member, the outer and the inner surface which are not parallel to each other are not necessarily front and back surfaces.

Therefore, when the inner surface and the outer surface of the low-reflection structure 110 are an entrance surface and an exit surface, respectively, it is preferable to form the minute irregularities 2 in the inner surface, and to form the antiglare irregularities 113 in the outer surface.

The minute irregularities 2 and the antiglare irregularities 113 of the low-reflection structure 110 shown in FIG. 12(A) are formed in the single-layer transparent base 1 (continuous member). A multilayer transparent base may be used. For example, a low-reflection structure 110 may include a transparent base 1 consisting of a transparent main part 1a, a reflection-reducing part 1b provided with minute irregularities 2, and an antiglare part 1c provided with antiglare irregularities 113 as shown in FIG. 12(B).

The low-reflection structure 110 in the third embodiment includes the transparent base 1 provided with the minute irregularities 2 and the antiglare irregularities 113. The transparent base 1 of the low-reflection structure 110 in the third embodiment is substantially the same in construction as those of the first embodiment shown in FIGS. 1 to 10 and the second embodiment shown in FIG. 11, except that the transparent base 1 of the third embodiment is provided with the antiglare irregularities 113.

The shape of the transparent base 1 is dependent on the use of the low-reflection structure 110. For example, the low-reflection structure 110 has the shape of a flat plate as shown in FIG. 12(A). The low-reflection structure 110 may be a flexible sheet. The transparent base 1 does not necessarily need to be rigid. Usually, both the front and the back surface of the flat transparent base 1 are antireflection surfaces respectively provided with the antiglare irregularities 113 and the minute irregularities. However, side surfaces of the transparent base 1 may be antireflection surfaces. The transparent base 1 may be a three-dimensional member. When used as a cover plate for covering a display unit, the reflection-reducing structure 110 may have a flat reflection-reducing part, and a peripheral part surrounding the flat reflection-reducing part and provided with ribs or the like for connecting the low-reflection structure 110 to a mount. When the transparent base 1 has the shape of a flat plate, the thickness of the same as intended for use as a cover plate for a display unit or the like is, for example in the range of abut 0.5 to about 2 mm.

Although it is easy to form a surface of the transparent base 1 provided with the minute irregularities 2 in a flat surface, the same surface is not limited to a flat surface. A surface of the transparent base 1 provided with the antiglare irregularities 113 may be either a flat surface or a curved surface.

The minute irregularities 2 are parts of the transparent base 1. The transparent base 1 and the minute irregularities 2 may be formed integrally of the same material as those of the low-reflection structure 110 shown in FIG. 12(A). A transparent main part (transparent body) 1a and a reflection-reducing part 1b provided with minute irregularities 2 may be closely bonded together as those of the low-reflection structure 110 shown in FIG. 12(B). The transparent base 1a of the low-reflection structure 110 shown in FIG. 11(B) consists of the transparent main part 1a, the reflection-reducing part 1b provided with the minute irregularities 2, and the antiglare part 1c provided with the antiglare irregularities 113.

In brief, the transparent base 1 provided with the minute irregularities 2 and the antiglare irregularities 113 of the low-reflection structure 110 shown in FIG. 12(A), which is a single, continuous member formed of a single material, can be formed by a single injection molding cycle.

The low-reflection structure 110 shown in FIG. 12(B) including the transparent base 1 consisting of the transparent main part 1a, the reflection-reducing part 1b provided with the minute irregularities 2, and the antiglare part 1c provided with the antiglare irregularities 113 can be made by forming a shaped, transparent, main part 1a of glass or a resin, and simultaneously forming a reflection-reducing par 1b and a antiglare part 1c of a hardening resin, such as an ionizing-radiation-hardening resin, on the opposite surfaces of the transparent main part 1a, and forming minute irregularities 2 and antiglare irregularities 113 in the reflection-reducing part 1b and the antiglare part 1c, respectively, by a 2P process (photopolymerization process). The antiglare part 1c may b formed by a coating process. The minute irregularities 2 and the antiglare irregularities 113 can be formed by an injection molding process, an insert molding process or a two-color molding process. These processes use a mold provided with irregularities complementary to the minute irregularities 2 or the antiglare irregularities 113, i.e., a shaping mold.

Antiglare Irregularities

The antiglare irregularities 113 are one of types of conventional reflection-reducing techniques that uses irregularities of a scale greater than wavelengths in the visible region to reduce regular reflection of light by diffusing light. The antiglare irregularities 113 that reduce regular reflection of light by scattering and diffuse scattered light do not have direct effect on the improvement of transmittance. However, antiglare irregularities formed on a cover plate for a display, such as a flat display, reduce the reflection of external light. Consequently, objects behind the user are scarcely reflected in the cover plate and thereby the visibility of images displayed by the display can be improved.

The antiglare irregularities 113 are greater than wavelengths in the visible region and the minute irregularities 2. Therefore, the antiglare irregularities 113 are less liable to be damaged than the minute irregularities 2.

Known antiglare irregularities greater than the wavelengths in the visible region disclosed in JP-A No. 193333/1997 have a mean pitch $S_m$ in the range of 60 to 180 $\mu$m and a center line average roughness $R_a$ in the range of 0.05 to 0.2 $\mu$m.

The antiglare irregularities 113 may be conventional ones. Proper antiglare irregularities may be selected taking into consideration use, required performance and costs. The antiglare irregularities 113 may be (1) those formed in a coating film formed by spreading a coating liquid prepared by dispersing transparent inorganic or organic particles, such as silica particles or resin beads, such as acrylic resin beads or polystyrene resin beads, in a resin binder, (2) those formed by embossing the aforesaid coating film or a sheet while or after forming the same, or by shaping the surface of the aforesaid coating film with a shaping sheet formed of a resin containing particles and provided with irregularities in its surface, (3) those formed in an antiglare sheet provided with the foregoing antiglare irregularities on the surface and bonded to the transparent base 1 with an adhesive or by thermal bonding (JP-A Nos. 18706/1994, 193332/1997, 193333/1997 and 326608/1999). Although the antiglare irregularities 113 are different in size from the minute irregularities 2, the antiglare irregularities 113 may be formed in any one of the aforesaid processes of forming the minute irregularities 2, such as a 2P process, an injection molding process and a sol-gel transformation process. An injection molding process is capable of simultaneously forming the minute irregularities and the antiglare irregularities when molding the transparent base and hence is excellent in productivity.

When a coating film provided with the antiglare irregularities 113 is used, it is preferable to form the coating film of a resin having high mechanical properties, such as high scratch resistance, because the antiglare irregularities 113 are formed in the outer surface of the low-reflection structure 110. Although the coating film may be formed of a resin for preparing the resin binder in which inorganic or organic particles are dispersed or a thermoplastic resin used by a 2P process or an embossing process using a shaping sheet, it is preferable to form the coating film of a hardening resin. Suitable thermoplastic resins are, for example, acrylic resins, cellulose resins polyolefin resins and polyester resins. Suitable hardening resins are, for example, thermosetting resins including urethane resins, epoxy resins and melamine resins, and ionizing-radiation hardening resins including acrylate resins which harden when irradiated with ultraviolet radiation or electron beams. Above all, ionizing-radiation-hardening resins are excellent in surface strength and in maintaining the antireflection ability of the antiglare irregularities.

Preferable ionizing-radiation-hardening resins are ionizing-radiation-hardening compounds produced by properly mixing prepolymers (including oligomers) and/or monomers, and capable of hardening when irradiated with ionizing radiation (photopolymerization). Those prepolymers or monomers are used singly or in a mixture.

Those prepolymers or monomers are compounds having molecules including radical-polymerizable unsaturated groups, such as (meth)acryloyl groups or (meth)acryloiloxy groups and compounds having molecules including cation-polymerizable functional groups, such as epoxy groups. Polyethylene/thiol polymers each produced by combining a polyene and a polythiol are preferable materials. The term "(meth)acryloyl groups" signifies acryloyl groups or methacryloil groups. Similarly, in the following description, the term "(meth)acrylate" signifies acrylate or methacrylate.

Prepolymers having radical-polymerizable unsaturated groups include polyester (meth)acrylate, urethane (meth)acrylate, epoxy (meth)acrylate, melamine (meth)acrylate, triadine (meth)acrylate and silicone(meth)acrylate. Usually, the molecular weight of those prepolymers is in the range of 250 to 100,000.

Monomers having radical-polymerizable unsaturated groups include single-functional monomers, such as methyl (meth)acrylate, 2-ethylhexyl (meth)acrylate and phenoxyethyl (meth)acrylate, and polyfunctional monomers, such as diethylene glycol (meth)acrylate, propylene glycol di(meth)acrylate, trimethylpropane tri(meth)acrylate, trimethylolpropane ethyleneoxide tri(meth)acrylate, dipentaerythritol tetra (meth)acrylate, dipentaerythritol penta(meth)acrylate, and dipentaerysthritol hexa(meth)acrylate.

Prepolymers having cation-polymerizable functional groups include prepolymers of epoxy resins, such as bisphennol epoxy resins and novolak epoxy compounds, and vinyl ether resins, such as fatty vinyl ether resins and aromatic vinyl ether resins.

Thiols include polythiols, such as trimethylolpropane trithioglycolates andpentaerythritol tetrathioglycolates. Polyenes include those having arylalcohol at the opposite ends of polyurethane of diol and diisocyanate.

When the ionizing-radiation-hardening resin is hardened by irradiation with ultraviolet radiation or visible light rays, a photopolymerization initiator is added to the ionizing-radiation-hardening resin. Photopolymerization initiators to be used in combination with resins having radical-polymerizable unsaturated groups include acetophenone, benzophenone, thioxanthane, benzoin, benzoin methylether and mixtures of some of those. Photopolymerization initiators to be used in combination with resins having cathion-polymerizable functional groups include aromatic diazonium salts, aromatic sulfonium salts, aromatic iodonium salts, metallocene compounds, benzoin sulfonates and mixtures of some of those. A mixture of a photopolymerization initiator and an ionizing-radiation-hardening resin contains 100 parts by mass ionizing-radiation-hardening resin and about 0.1 to about 10 parts by mass photopolymerization initiator.

The ionizing radiation is electromagnetic waves or charged particles having energy sufficient for hardening molecules of the ionizing-radiation-hardening resin (compound). Usually, the ionizing radiation is ultraviolet radiation or electron beams. Visible rays, x-rays and ion beams are possible ionizing radiation. Possible ultraviolet sources include extra-high-pressure mercury lamps, high-pressure mercury lamps, low-pressure mercury lamps, carbon arc lamps, black light lamps and metal halide lamps. Ultraviolet radiation of wavelengths in the range of 190 to 380 nm are used in most cases. Possible electron beam sources include Cockcroft-Walton type, Van de Graff type, resonant transformer type, insulated core transformer type, linear type, dynamitron type and radio-frequency type electron beam accelerators, which are capable of emitting electrons having energy in the range of 100 59 300 keV.

When necessary, a thermoplastic resin, such as a vinyl chloride-acetate copolymer, polyvinyl acetate, an acrylic resin or a cellulose resin, may be added to the ionizing-radiation-hardening resin.

Particles dispersed in the resin binder to form the antiglare irregularities 113 in the antiglare part 1c, i.e., a film, are transparent particles of an inorganic material, such as silica, alumina, calcium carbonate, barium sulfate or the like, resin beads of an acrylic resin, a polycarbonate resin, a styrene resin or the like, or glass beads.

When the antiglare irregularities are formed by shaping, a shaping sheet may be formed by using the foregoing film provided with irregularities complementary to the antiglare irregularities 113.

Uses of the Low-reflection Structure

The low-reflection structure 110 may be formed in any optional shape, such as the shape of a film (or a sheet), a plate or a three-dimensional structure. There are not particular restrictions on the use of the low-reflection structure 110. However, since the reflection-reducing minute irregularities 2 are very fine, it is desirable to handle the low-reflection structure 110 attentively so as not to damage or soil the minute irregularities 2. Therefore it is preferable to used the low-reflection structure 110 with the minute irregularities 2 facing inside and the antiglare irregularities 113 facing outside. Uses of the present invention is not limited to those which will be mentioned below.

For example, the low-reflection structure 110 is used as a cover plate for covering the display units of various devices, such as portable telephones. In such a display unit, a plate or a cover plate formed by molding a resin is disposed in front of a display panel, such as an LCD. When the low-reflection structure 110 is used as such a cover plate, it is desirable that the antiglare irregularities 113 face outside and the minute irregularities 2 characteristic of the present invention face inside. The display unit may be a mechanical means such as a mechanical analog meter, typically a watch, instead of a display panel, such as an LCD.

The cover plate having the shape of a flat plate may be provided in its peripheral part with projections for attaching the cover plate to a relevant structure or for aesthetic effects.

The low-reflection structure 110 in the shape of a film (or sheet) or a plate can be used as a transparent electrode film or a transparent plate for a transparent touch panel or the like. A transparent touch panel is used to add an input function to a display unit. Since a display panel, such as an LCD or a CRT, and a transparent touch panel are separate components of an assembly, a gap is formed inevitably between the display panel and the transparent touch panel and hence light is reflected. Such reflection of light can be reduced by using the low-reflection structure 110 including the transparent base 1 provided on its inner surface with the minute irregularities 2 characteristic of the present invention, and the antiglare irregularities 113 as the transparent touch panel.

The present invention will be further described in terms of its examples.

EXAMPLE 3-1

A low-reflection structure 110 of construction as that shown in FIG. 12(B) was fabricated by the following processes.

A 600 nm thick resist layer of a photosensitive resin (Microposit S1805 commercially available from Sipley Co., Inc.) was formed on a 3 mm thick glass substrate by a spin coat process. The resist layer was irradiated twice with laser beams emitted by argon ion lasers and falling thereon at an incident angle of 50° from two directions, in which the glass substrate was held at a first position and at a second position at an angle of 90° from the first position.

The exposed resist layer was developed using a developer to obtain desired minute irregularities. Thus, an original mold (mother mold) including the glass substrate and the resist layer provided with the minute irregularities and formed on the glass substrate was obtained.

A 1 mm thick transparent acrylic resin plate as a transparent main part 1a was formed. A 2 μm thick antiglare part 1c was formed on a surface to be used as an outer surface of the transparent main part 1a by spreading a coating liquid prepared by mixing an ionizing-radiation-hardening urethane acrylate resin and 10% by mass of silica particles having an average particle size of 3 μm on the surface of the transparent main part 1a by a spin coat process, and irradiating the coating liquid film for hardening with ultraviolet radiation emitted by a high-pressure mercury lamp.

A reflection-reducing part 1b having minute irregularities 2 was formed of an ionizing-radiation-hardening acrylate resin on the other surface to be used as an inner surface of the transparent main part 1a by a 2P process, in which the ionizing-radiation-hardening acrylate resin was applied in a film of 2 g/m$^2$ to the inner surface of the transparent main part 1a by potting, the master mold was pressed against the ionizing-radiation-hardening acrylate resin film, the ionizing-radiation-hardening acrylate resin film was irradiated through the transparent main part 1a with ultraviolet radiation emitted by a high-pressure mercury lamp for the photopolymerization of the ultraviolet-curable resin, and then the master mold was removed to complete the reflection-reducing part 1b. Thus, a low-reflection structure 110 having the shape of a transparent plate as shown in FIG. 12(B) was obtained.

It was found through the observation of the minute irregularities 2 of the low-reflection structure 110 with an atomic force microscope that projections were arranged regularly in a square grid, the minimum height $H_{MIN}$ of the projections of the minute irregularities was 200 nm, and the maximum pitch $P_{MAX}$ among those between the projections was 300 nm.

Comparative Example 3-1

A low-reflection structure in Comparative example 3-1 was the same in construction as the low-reflection structure 110 in Example 3-1, except that the former was not provided with any part corresponding to the minute irregularities 2 and was provided with only antiglare irregularities 113.

Performance Evaluation

The transmittance (visual transmittance) and reflectance (visual reflectance) of the low-reflection structures in Example 3-1 and Comparative example 3-1 were measured.

The low-reflection structure 110 in Example 3-1 had a transmittance of 94.3% and a reflectance of 1.48%, while the low-reflection structure in Comparative example 3-1 not provided with minute irregularities and provided with only the antiglare irregularities had a transmittance of 91.4% and a reflectance of 5.56%. Thus, the low-reflection structure in Comparative example 3-1 was inferior in both transmittance and reflectance to that in Example 3-1.

Both the minute irregularities and antiglare irregularities of the low-reflection structure of the present invention are effective in reducing reflection, and hence the reflection-reducing performance of the low-reflection structure of the present invention is higher than that of a low-reflection structure provided with minute irregularities only in one surface thereof. Transmittance increases in proportion to the reduction of reflectance. Therefore, the low-reflection structure as used as a cover plate for covering the display unit, such as a display, improves the visibility of images displayed by the display unit and enhances light utilization efficiency. The reflection-reducing structure provided with the minute irregularities in its inner surface and the antiglare irregularities in its outer surface is satisfactory in the durability of its reflection-reducing effect and in its antiglare performance.

What is claimed is:

1. A cover plate for a display device provided with a display panel, comprising a transparent base disposed so as to cover the display panel, and having a surface facing the display panel and provided with reflection-reducing minute irregularities;

wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in a visible region of visible light in a vacuum, and sectional area ratio of total area of sections of the projections of the transparent base in a plane parallel to the transparent base in the plane increases continuously and gradually in a direction from the tips of the projections toward bottoms of the valleys.

2. The cover plate according to claim 1, wherein the transparent base meets a condition expressed by:

$$P_{MAX} \leq \lambda_{MIN}/n_b$$

where $n_b$ is a refractive index of the transparent base.

3. The cover plate according to claim 2, wherein the minimum wavelength $\lambda_{MIN}$ in the visible region of visible light in a vacuum is 380 nm and hence $P_{MAX} \leq 380/n_b$.

4. The cover plate according to claim 1, wherein the projections and the valleys of the reflection-reducing minute irregularities have substantially the same shapes, respectively.

5. The cover plate according to claim 1, wherein the projections and the valleys of the reflection-reducing minute irregularities are arranged at the same pitches.

6. The cover plate according to claim 1, wherein the projections of the reflection-reducing minute irregularities meet a condition expressed by:

$$H_{MIN} \geq 0.2\lambda_{MAX}$$

where $H_{MIN}$ is the minimum height of the projections.

7. The cover plate according to claim 6, wherein the projections of the reflection-reducing minute irregularities meet a condition expressed by:

$$H_{MIN} \geq 0.4\lambda_{MAX}.$$

8. The cover plate according to claim 1, wherein the projections of the reflection-reducing minute irregularities meet a condition expressed by:

$$H_{MIN}/P_{MAX} = 1/2 \text{ to } 4/1$$

where $H_{MIN}$ is the minimum height of the projections of the reflection-reducing minute irregularities.

9. A cover plate making method of making a cover plate for a display device, having a transparent base having one surface provided with reflection-reducing minute irregularities, comprising the steps of:

forming a resist film on a glass plate;

forming a resist pattern by subjecting the resist film to exposure and developing processes for patterning;

forming a mold provided with mold minute irregularities by etching the glass plate using the resist pattern as a mask; and forming the transparent base provided with the reflection-reducing minute irregularities by using the mold provided with the mold minute irregularities.

10. The cover plate making method according to claim 9, wherein the resist pattern is formed by exposing the resist film by electron beam lithography, and developing the exposed resist film for patterning.

11. The cover plate making method according to claim 9, wherein the resist pattern is formed by exposing the resist film to light by laser beam lithography, and developing the exposed resist film for patterning.

12. The cover plate making method according to claim 9, wherein the transparent base provided with the reflection-reducing minute irregularities is molded by an injection molding process using the mold provided with the mold minute irregularities.

13. A display device comprising:

a display panel; and a transparent base covering the display panel and having a surface facing the display panel and provided with reflection-reducing minute irregularities;

wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in the visible region of visible light in a vacuum, and sectional area ratio of total area of sections of the projections of the transparent base in a plane parallel to the transparent base in the plane increases continuously and gradually in a direction from the tips of the projections toward bottoms of the valleys.

14. A low-reflection structure comprising:
a transparent base having one surface provided with reflection-reducing minute irregularities; and
an antireflection film formed on the other surface of the transparent base;
wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in the visible region of visible light in a vacuum, and
sectional area ratio of total area of sections of the projections of the transparent base in a plane parallel to the transparent base in the plane increases continuously and gradually in a direction from the tips of the projections toward bottoms of the valleys.

15. The reflection-reducing structure according to claim 14, wherein
the transparent base meets a condition expressed by:

$$P_{MAX} \leq \lambda_{MIN}/n_b$$

where $n_b$ is a refractive index of the transparent base.

16. The reflection-reducing structure according to claim 15, wherein
the minimum wavelength $\lambda_{MIN}$ in the visible region of visible light in a vacuum is 380 nm and hence $P_{MAX} \leq 380/n_b$.

17. The reflection-reducing structure according to claim 14, wherein
the projections and the valleys of the reflection-reducing minute irregularities have substantially the same shapes, respectively.

18. The reflection-reducing structure according to claim 14, wherein
the projections and the valleys of the reflection-reducing minute irregularities are arranged at the same pitches.

19. The reflection-reducing structure according to claim 14, wherein the projections of the reflection-reducing minute irregularities meet a condition expressed by:

$$H_{MIN} \geq 0.2\lambda_{MAX}$$

where $H_{MIN}$ is the minimum height of the projections.

20. The reflection-reducing structure according to claim 19, wherein
the projections of the reflection-reducing minute irregularities meet a condition expressed by:

$$H_{MIN} \geq 0.4\lambda_{MAX}.$$

21. The reflection-reducing structure according to claim 14, wherein
the projections of the reflection-reducing minute irregularities meet a condition expressed by:

$$H_{MIN}/P_{MAX} = 1/2 \text{ to } 4/1$$

where $H_{MIN}$ is the minimum height of the projections of the reflection-reducing minute irregularities.

22. A reflection-reducing structure comprising:
a transparent base having a first surface provided with reflection-reducing minute irregularities, and a second surface provided with antiglare irregularities of sizes greater than wavelengths in a visible region;
wherein the reflection-reducing minute irregularities of the transparent base consist of numerous projections and numerous valleys lying between the projections, and meet a condition expressed by:

$$P_{MAX} \leq \lambda_{MIN}$$

where $P_{MAX}$ is the maximum distance between the tips of the adjacent projections, and $\lambda_{MIN}$ is the minimum wavelength in the visible region of visible light in a vacuum, and
sectional area ratio of total area of sections of the projections of the transparent base in a plane parallel to the transparent in the plane increases continuously and gradually in a direction from the tips of the projections toward bottoms of the valleys.

23. The reflection-reducing structure according to claim 22, wherein
the transparent base meets a condition expressed by:

$$P_{MAX} \leq \lambda_{MIN}/n_b$$

where $n_b$ is a refractive index of the transparent base.

24. The reflection-reducing structure according to claim 23, wherein
the minimum wavelength $\lambda_{MIN}$ in the visible region of visible light in a vacuum is 380 nm and hence $P_{MAX} \leq 380/n_b$.

25. The reflection-reducing structure according to claim 22, wherein
the projections and the valleys of the reflection-reducing minute irregularities have substantially the same shapes, respectively.

26. The reflection-reducing structure according to claim 22, wherein
the projections and the valleys of the reflection-reducing minute irregularities are arranged at the same pitches.

27. The reflection-reducing structure according to claim 22, wherein
the projections of the reflection-reducing minute irregularities meet a condition expressed by:

$$H_{MIN} \geq 0.2\lambda_{MAX}$$

where $H_{MIN}$ is the minimum height of the projections.

28. The reflection-reducing structure according to claim 27, wherein
the projections of the reflection-reducing minute irregularities meet a condition expressed by:

$$H_{MIN} \geq 0.4\lambda_{MAX}.$$

29. The reflection-reducing structure according to claim 22, wherein
the projections of the reflection-reducing minute irregularities meet a condition expressed by:

$$H_{MIN}/P_{MAX} = 1/2 \text{ to } 4/1$$

where $H_{MIN}$ is the minimum height of the projections of the reflection-reducing minute irregularities.

* * * * *